United States Patent [19]

Murashima et al.

[11] Patent Number: 5,666,583
[45] Date of Patent: Sep. 9, 1997

[54] CAMERA HAVING AN AUTOMATICALLY EJECTABLE CARTRIDGE

[75] Inventors: Nobuharu Murashima, Nara; Takuya Ueno, Hashimoto, both of Japan

[73] Assignee: Minolta Co., Ltd., Osaka, Japan

[21] Appl. No.: 296,889

[22] Filed: Aug. 29, 1994

[30] Foreign Application Priority Data

Aug. 30, 1993 [JP] Japan ................................. 5-213804

[51] Int. Cl.⁶ ............................................. G03B 17/02
[52] U.S. Cl. .................. 396/439; 396/511; 396/535; 396/536
[58] Field of Search ................. 354/21, 174, 214, 354/288; 396/360, 511, 535, 536, 538, 410, 411

[56] References Cited

U.S. PATENT DOCUMENTS

| | | | |
|---|---|---|---|
| 5,021,816 | 6/1991 | Pagano et al. | 354/275 |
| 5,159,365 | 10/1992 | Takahashi et al. | 354/21 |
| 5,234,180 | 8/1993 | Hsu | 242/200 |
| 5,307,099 | 4/1994 | Kawamura et al. | 354/21 |
| 5,337,971 | 8/1994 | Niedospial, Jr. | 354/275 |
| 5,463,435 | 10/1995 | Ezawa | 354/21 |

FOREIGN PATENT DOCUMENTS

| | | |
|---|---|---|
| 3-236030 | 10/1991 | Japan . |
| 4-80735 | 3/1992 | Japan . |
| 4-80734 | 3/1992 | Japan . |
| 4-295835 | 10/1992 | Japan . |

*Primary Examiner*—Safet Metjahic
*Assistant Examiner*—Eddie C. Lee
*Attorney, Agent, or Firm*—Burns, Doane, Swecker & Mathis, LLP

[57] ABSTRACT

A cartridge holder engages with a cartridge holder driving gear driven by a driving force of an ejecting motor. The ejecting motor is controlled by a microcomputer so that ejecting is performed in succession to the completion of the rewinding of the film.

14 Claims, 24 Drawing Sheets

CAMERA HAVING AN AUTOMATICALLY EJECTABLE CARTRIDGE

BACKGROUND OF THE INVENTION

1. Field of the Invention

The present invention relates to a camera, and more specifically, to a camera provided with a cartridge holder shiftable between a closed position and an ejected position.

2. Description of the Prior Art

There have been cameras which automatically rewind the film when all the frames of the film are exposed.

However, a user of the camera (especially, a beginner) is sometimes puzzled by not knowing whether he or she may open the rear cover (i.e. cartridge holder) to replace the film cartridge when the rewinding of the film is finished. Moreover, a real beginner sometimes may not know which part of the camera should be opened to replace the film cartridge.

Japanese Laid-open Patent Applications Nos. H4-80734 and H4-80735 disclose cameras having an ejected position outside a film cartridge housing space at which a film cartridge is attachable and detachable and a closed position at which the film cartridge is housed in the film cartridge housing space.

However, the movement of the film cartridge between the ejected and closed positions is made by activating a driving means for the film cartridge, for example, by a key operation. For this reason, a beginner may be bewildered if he or she does not know that a key must be operated.

SUMMARY OF THE INVENTION

An object of the present invention is to provide a camera which urges the user to replace the film cartridge in a manner even a beginner would easily understand.

To achieve the above-mentioned object, according to the present invention, an apparatus using a film cartridge is provided with the following: a space provided in a body of the apparatus for housing the film cartridge; an ejector which ejects the film cartridge from the film cartridge housing space to a location outside of the film cartridge housing space; a film rewinder which rewinds a film into the film cartridge; and a controller which activates the ejector in response to completion of rewinding performed by the film rewinder.

Thus, since the ejector which ejects the film cartridge is controlled by the controller so that the ejection operation of the film cartridge is started in succession with the completion of the film rewinding operation by the film rewinder, the film cartridge is moved to the ejected position without any switch operation by the user. As a result, the replacement of the film cartridge is easy even for a beginner.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
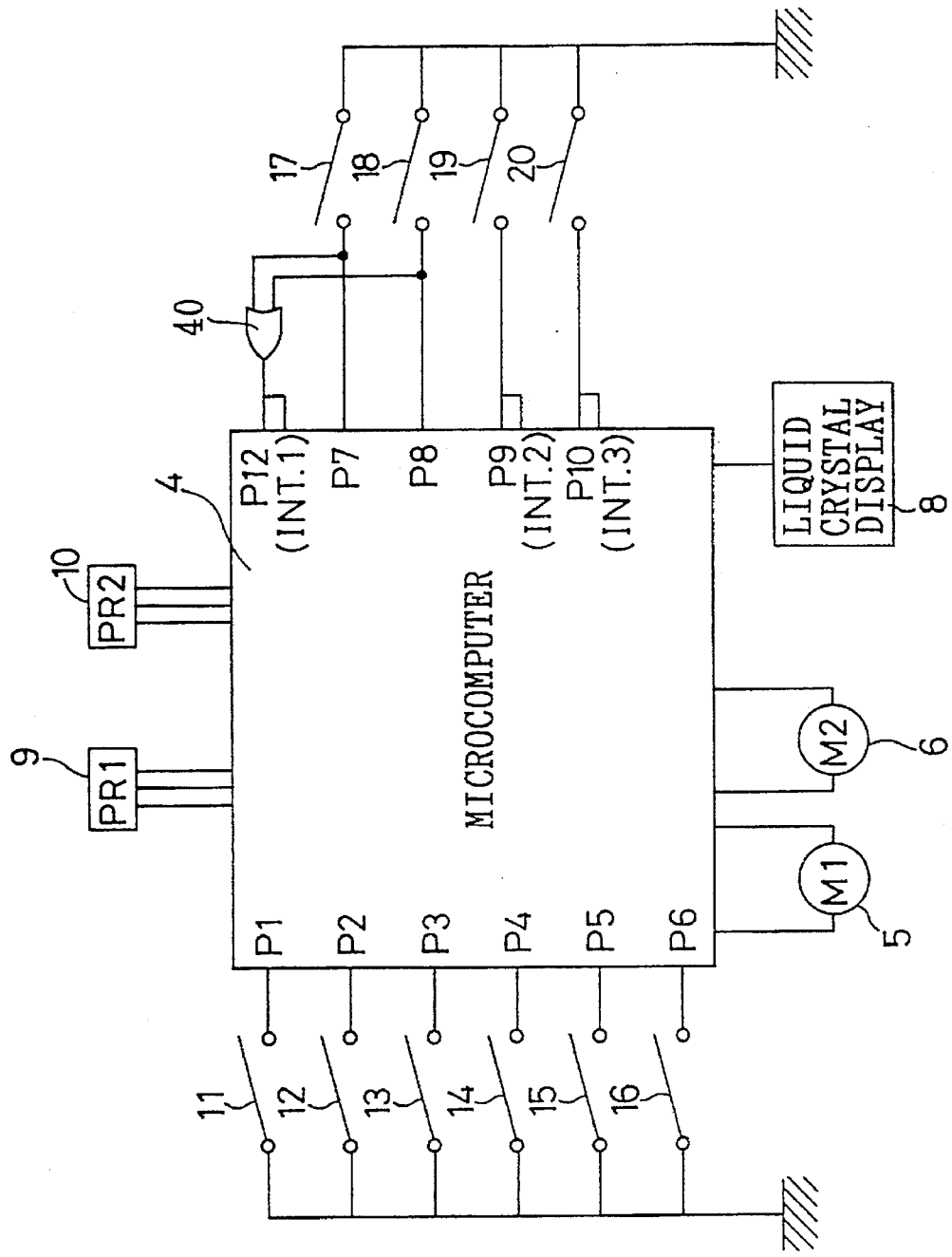
FIG. 1 is a circuit diagram of a first embodiment of the present invention.

Hereinafter, embodiments of the present invention will be described with reference to the drawings. Referring to FIG. 1, there is shown a circuit diagram of a camera according to a first embodiment of the present invention. A microcomputer 4 controls operations of the camera. A film transporting motor 5 performs film transporting operations (i.e. thrusting, winding and rewinding operations). An ejecting motor 6 performs an ejecting operation and a closing operation of a subsequently-described cartridge holder 23 (FIGS. 4 to 7). A liquid crystal display 8 provides displays such as selected modes. A film transporting photoreflector 9 is arranged where perforations of the film pass. During the thrusting and rewinding operations, the photoreflector 9 senses the end of the film, and during the winding operation, it senses that the film is wound by one frame. An information reading photoreflector 10, as described later, reads film information from an information disk 3 of a film cartridge 1 (FIG. 3), and senses a condition of the film cartridge 1.

A first mode selecting switch 11 connected to a terminal P1 is provided to select a mode among three modes (i.e. Mode 1, Mode 2 and Mode 3) shown in Table 1. A second mode selecting switch 12 connected to a terminal P2 is provided to select a mode between two modes (i.e. Mode A and Mode B) shown in Table 2. A mode entering switch 13 is provided to enter modes selected by the first and second mode switches, and is connected to a terminal P3.

The microcomputer 4 controls the camera according to the mode selected by the first mode selecting switch 11 and the second mode selecting switch 12. Specifically, every time the microcomputer 4 senses that the condition of the first mode selecting switch 11 or the second mode selecting switch 12 is changed from OFF to ON, the microcomputer 4 changes the mode by selecting a mode in the order of Mode 1, Mode 2, Mode 3 and Mode 1 or in the order of Mode A, Mode B and Mode A, and displays the selected mode on the liquid crystal display 8. A mode is entered which is being selected when the condition of the mode entering switch 13 is changed from OFF to ON.

Therefore, by operating the first mode selecting switch 11, either of the following modes is selected: a mode where the thrusting operation is started in succession to the completion of the closing operation; and a mode where the thrusting operation is started by a subsequently-described initial loading start switch 14 after the closing operation is finished. By operating the second mode selecting switch 12, either of the following modes are selected: a mode where the ejecting operation is started in succession to the completion of the rewinding operation; and a mode where the ejecting operation is started by an ejecting switch 20 after the rewinding operation is finished.

While the selection by the first mode selecting switch 11 is made among three modes and the selection by the second mode selecting switch 12 is made between two modes in this embodiment, the mode selections may be made among more than two modes.

Figure 6:
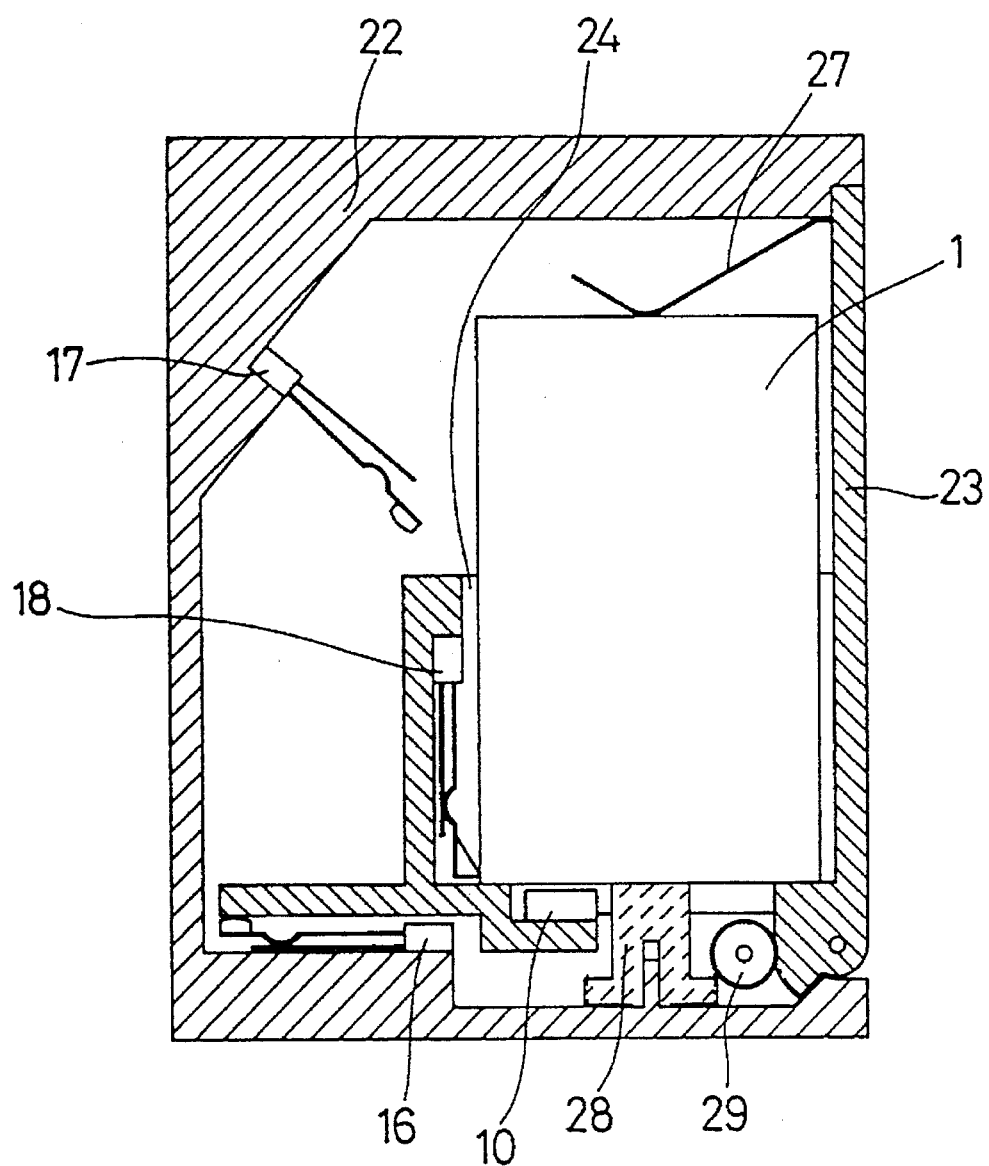
FIG. 6 is a longitudinal sectional view showing a closed condition of the cartridge holder in which the film cartridge is fitted.

The initial loading start switch 14 connected to a terminal P4 is provided to start the thrusting operation when Mode 1 or Mode 2 is selected. A partially exposed film rewinding switch 15 connected to a terminal P5 is provided to start the rewinding of partially exposed film. A closing sensing switch 16 connected to a terminal P6 is turned ON when the cartridge holder 23 is closed as shown in FIG. 6.

Figure 4:
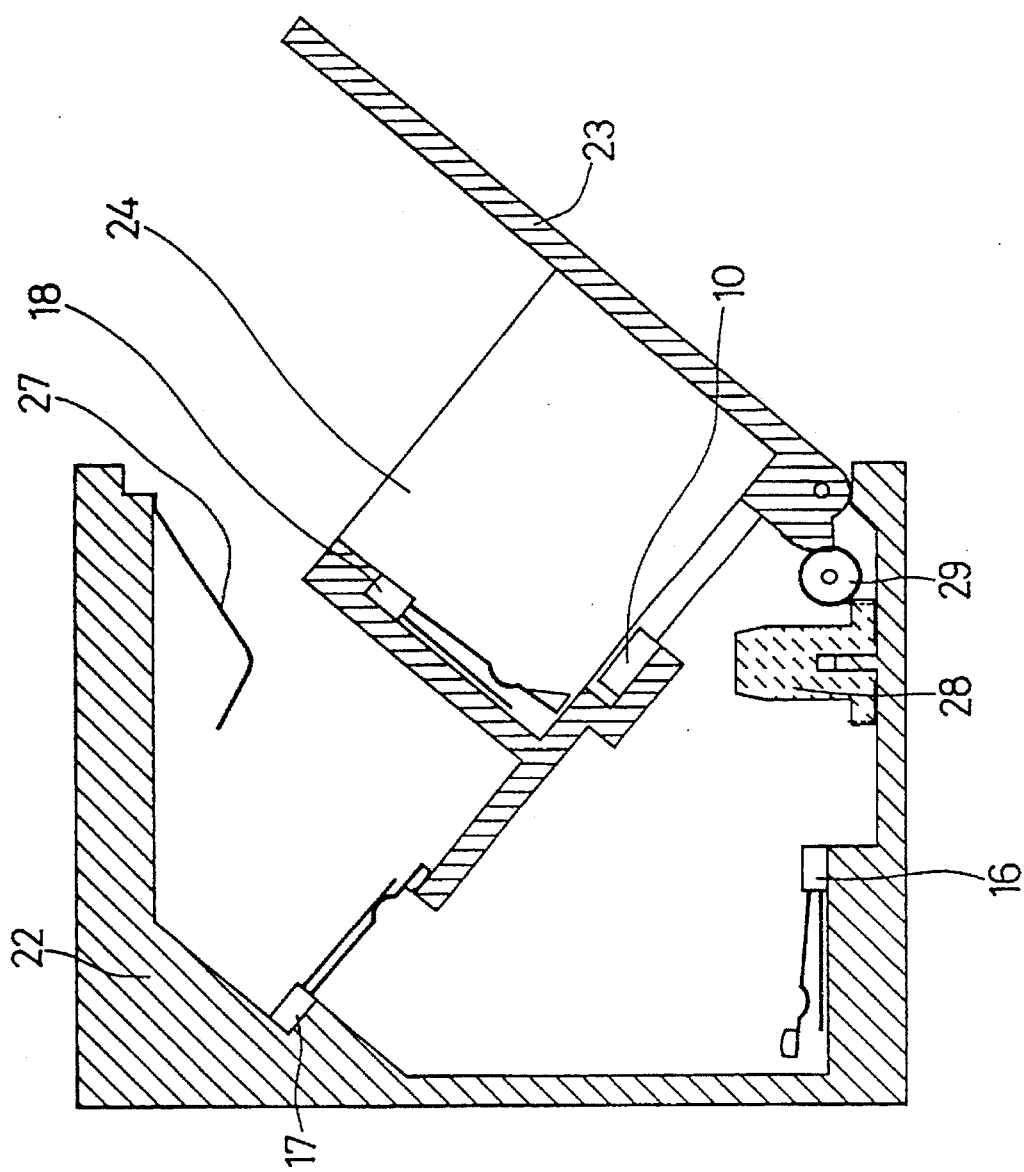
FIG. 4 is a longitudinal sectional view showing an ejected condition of a cartridge holder in the first embodiment of the present invention.
Figure 5:
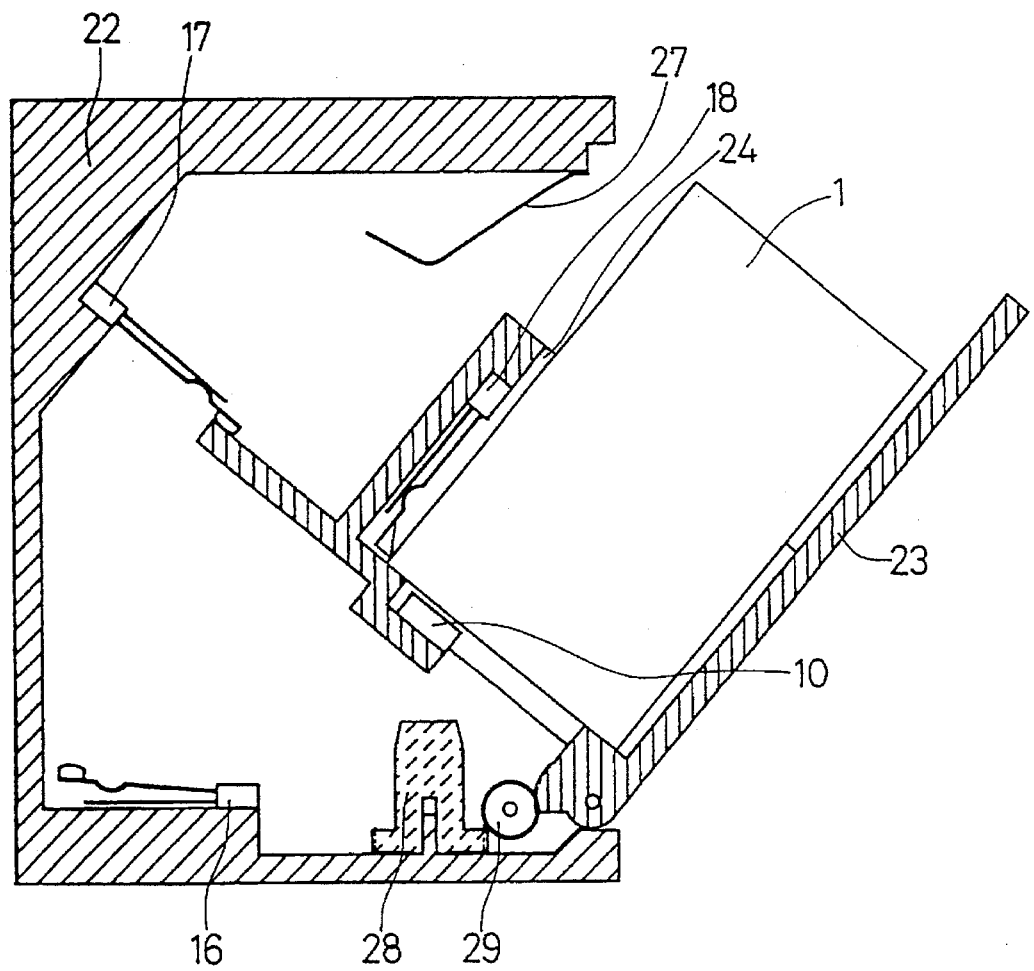
FIG. 5 is a longitudinal sectional view showing a condition where the film cartridge is fitted in the cartridge holder which is in the ejected condition.

An ejecting sensing switch 17 connected to a terminal P7 is turned ON when the cartridge holder 23 is ejected as shown in FIGS. 4 and 5. A cartridge sensing switch 18 connected to a terminal P8 is turned ON when the film cartridge 1 is fitted in a cartridge chamber 24 of the cartridge holder 23 as shown in FIG. 5. The switches 17 and 18 are both connected to a terminal P12 and to an interrupt terminal INT.1 via an OR gate 40. The closing operation is started when the condition of the ejecting sensing switch 17 is changed from ON to OFF or when the condition of the cartridge sensing switch 18 is changed from OFF to ON.

A release switch 19 connected to a terminal P9 and to an interrupt terminal INT.2 is provided to perform exposure when its condition is changed from OFF to ON. The ejecting switch 20 starts the ejecting operation when the cartridge holder 23 is closed and starts the closing operation when the cartridge holder 23 is ejected. The ejecting switch 20 is connected to a terminal P10 and to an interrupt terminal INT.3.

Figure 2:
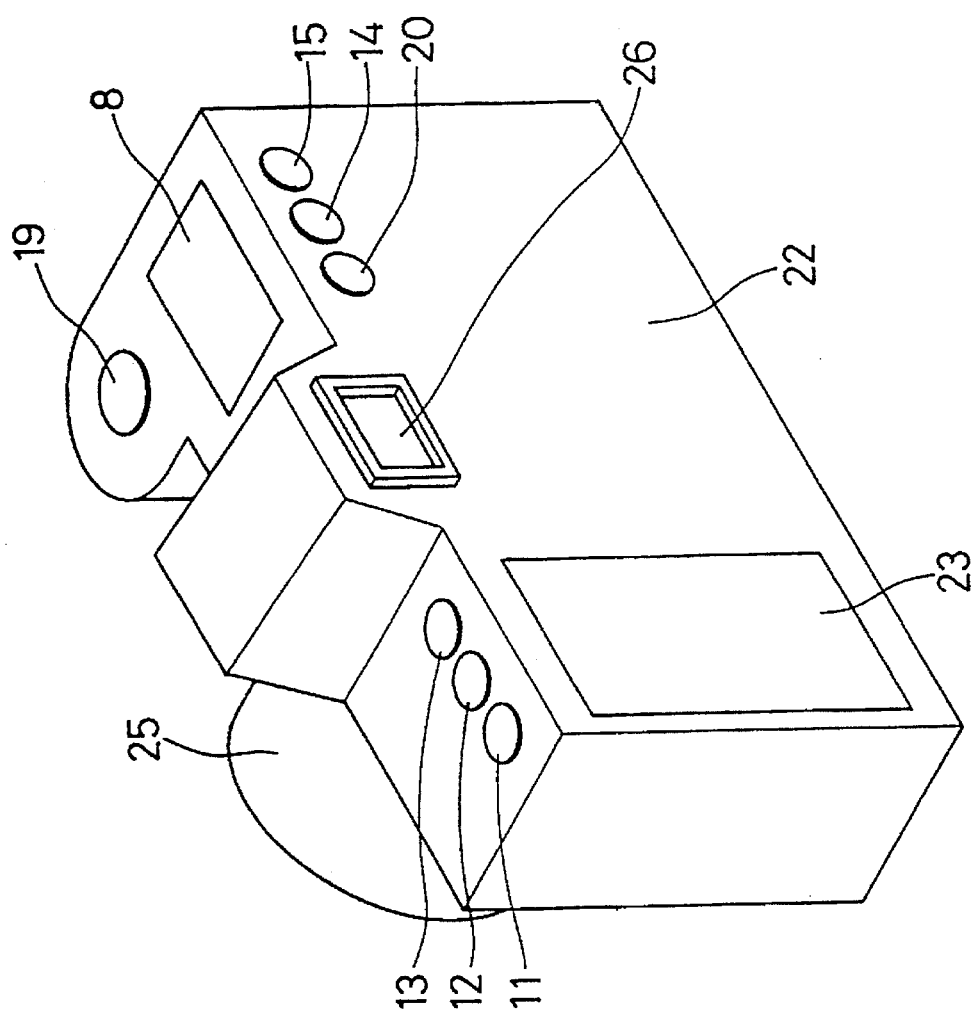
FIG. 2 is a perspective view showing the exterior of the first embodiment of the present invention.

Referring to FIG. 2, there is shown a perspective view of the exterior of the camera employing the first embodiment. Reference numeral 22 represents a camera body. Reference numeral 23 represents the cartridge holder. Reference numeral 25 represents a lens barrel. Reference numeral 26 represents a finder. The cartridge holder 23 is shiftable between a closed position and an ejected position. The liquid crystal display 8, the first mode selecting switch 11, the second mode selecting switch 12, the mode entering switch 13, the initial loading start switch 14, the partially exposed film rewinding switch 15, the release switch 19 and the ejecting switch 20 correspond to the ones of FIG. 1 given the same reference numerals.

Figure 3:
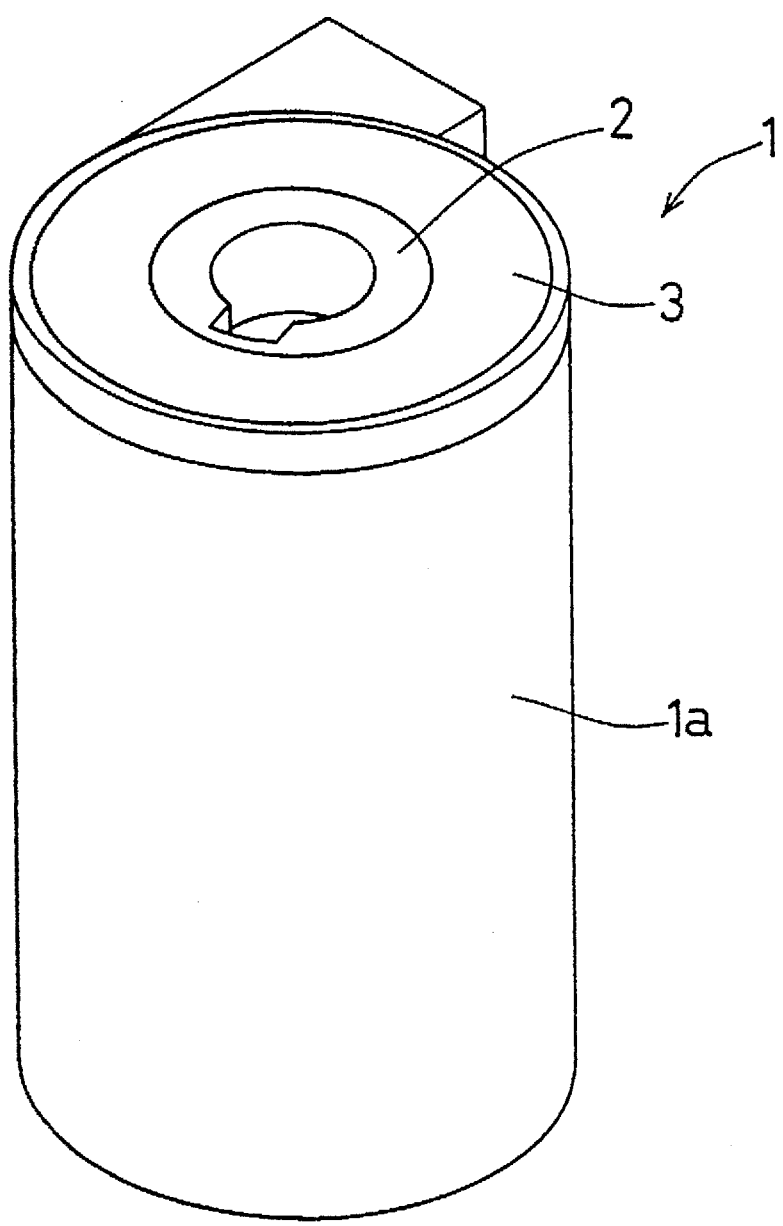
FIG. 3 is a perspective view showing the exterior of a film cartridge used in the embodiments of the present invention.

Referring to FIG. 3, there is shown a perspective view of the exterior of the film cartridge 1 used in the embodiments of the present invention. Reference designation 1a represents a cartridge body. Reference numeral 2 represents a cartridge spool. Reference numeral 3 represents the information disk. The spool 2 is attached to the cartridge body 1a at a particular angle according to whether the film cartridge 1 is in a fresh condition (a condition where the film has not been exposed at all) or in a partial condition (a condition where the film has been exposed partway) or in an exposed condition (a condition where all the frames of the film have been exposed). The information disk 3 rotates integrally with the spool 2. On the information disk 3, film information (hereinafter, sometimes referred to as "film data") such as the film sensitivity and the number of exposures is recorded to be optically readable. As described previously, the reading of film data from the information disk 3 and the condition (the fresh condition or the partial condition or the exposed condition) of the film cartridge 1 are sensed by the information reading photoreflector 10.

Referring to FIGS. 4 to 6, there are shown longitudinal sectional views of the cartridge holder 23 taken on an optical axis AX (FIG. 7) of subsequently-described taking lenses 30 and 31. FIG. 4 shows the ejected condition of the cartridge holder 23 where the film cartridge 1 is not fitted. FIG. 5 shows the ejected condition of the cartridge holder 23 where the film cartridge 1 is fitted. FIG. 6 shows the closed condition of the cartridge holder 23 where the film cartridge 1 is fitted (i.e. a condition where the film cartridge 1 is housed in the camera body 22 ).

The information reading photoreflector 10, the closing sensing switch 16, the ejecting sensing switch 17, the cartridge sensing switch 18 and the cartridge holder 23 correspond to the ones of FIGS. 1 and 2 given the same reference numerals. Reference numeral 24 represents the cartridge chamber for housing the film cartridge 1. Reference numeral 27 represents a film cartridge pressing spring. A fork 28 is designed to engage with the spool 2 of the film cartridge 1 when the cartridge holder 23 is closed, and is rotated by the driving force from the film transporting motor 5. A cartridge holder driving gear 29 which engages with the cartridge holder 23 causes the cartridge holder 23 to be ejected and closed.

Figure 7:
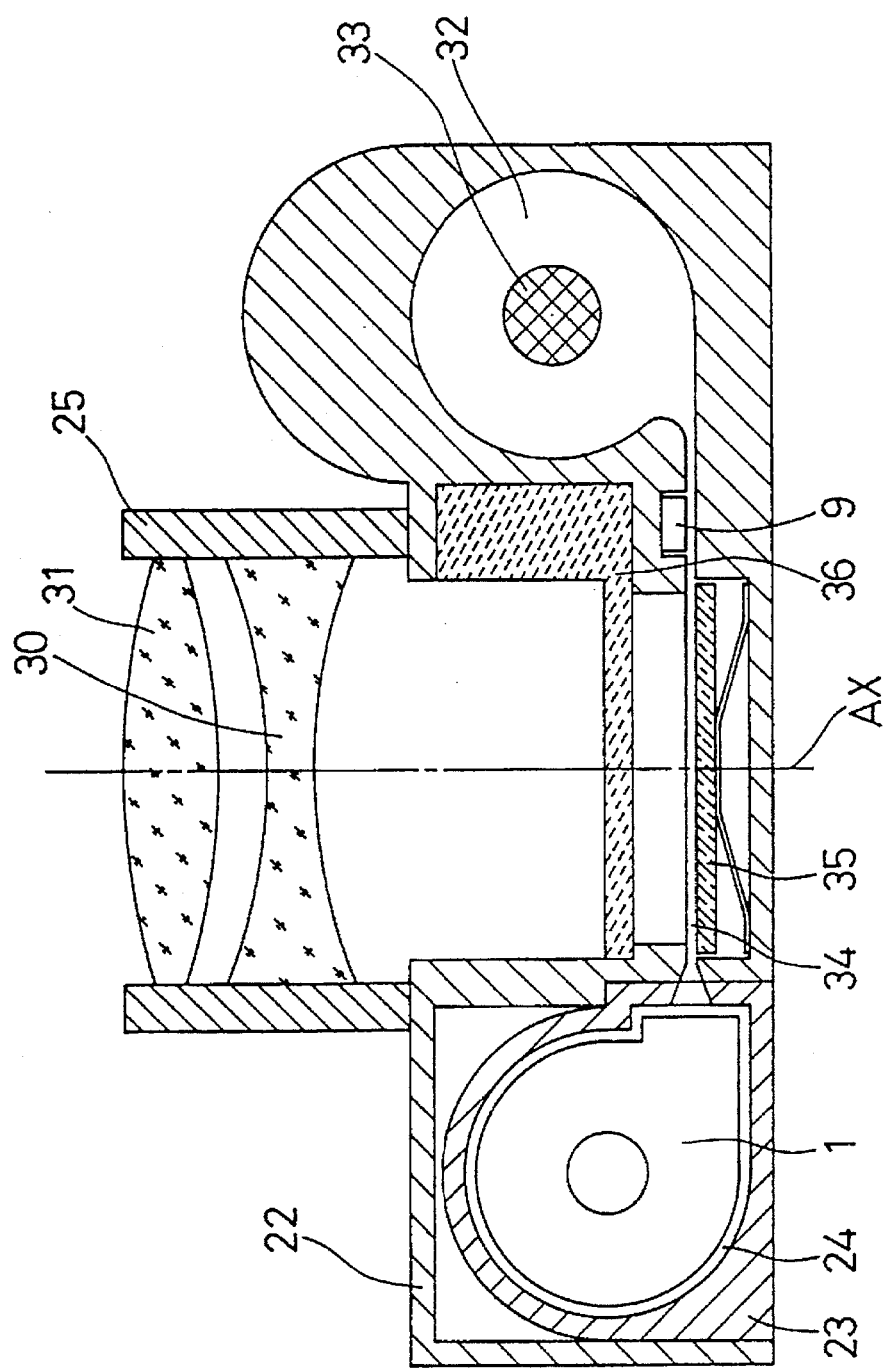
FIG. 7 is a transverse sectional view showing the first embodiment of the present invention.

Referring to FIG. 7, there is shown a transverse sectional view of the camera employing the first embodiment. The film cartridge 1, the film transporting photoreflector 9, the cartridge holder 23, the cartridge chamber 24 and the lens barrel 25 correspond to the ones of FIGS. 1 to 6 given the same reference numerals. Reference numerals 30 and 31 represent the taking lenses. Reference numeral 32 represents a film chamber for housing film sent out from the film cartridge 1. Reference numeral 33 represents a winding spool for winding film. Reference numeral 34 represents a film path. Reference numeral 35 represents a platen. Reference numeral 36 represents a shutter unit.

Referring to FIGS. 8 to 15, there are shown flowcharts of control operations of the first embodiment. First, a first interrupt operation performed when the closing operation is started will be described with reference to the flowchart of FIG. 8. When the condition of the ejecting sensing switch 17 is changed from ON to OFF by a slight depression of the cartridge holder 23 or when the condition of the cartridge sensing switch 18 is changed from OFF to ON by the fitting of the film cartridge 1 into the cartridge holder 23, the first interrupt operation is started according to an interrupt flow (closing start flow) INT.1.

By starting the first interrupt operation in response to the change in condition of the ejecting sensing switch 17 or the cartridge sensing switch 18, it is unnecessary to operate an operation member such as a closing button after the film cartridge 1 is fitted in the cartridge holder 23, which reduces the number of operations.

Figure 8:
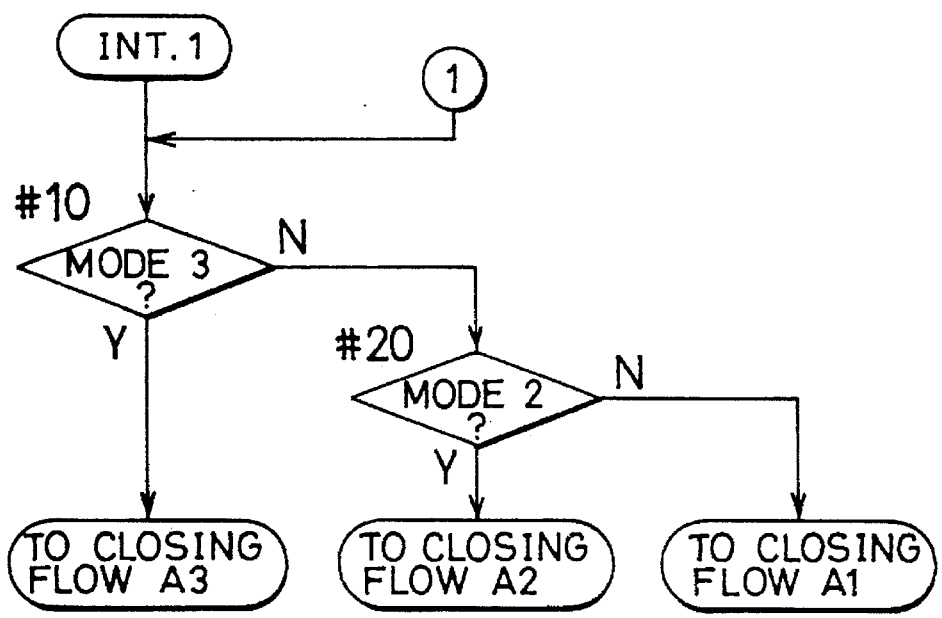
FIG. 8 is a flowchart of a first interrupt operation of the first embodiment of the present invention.
Figure 15:
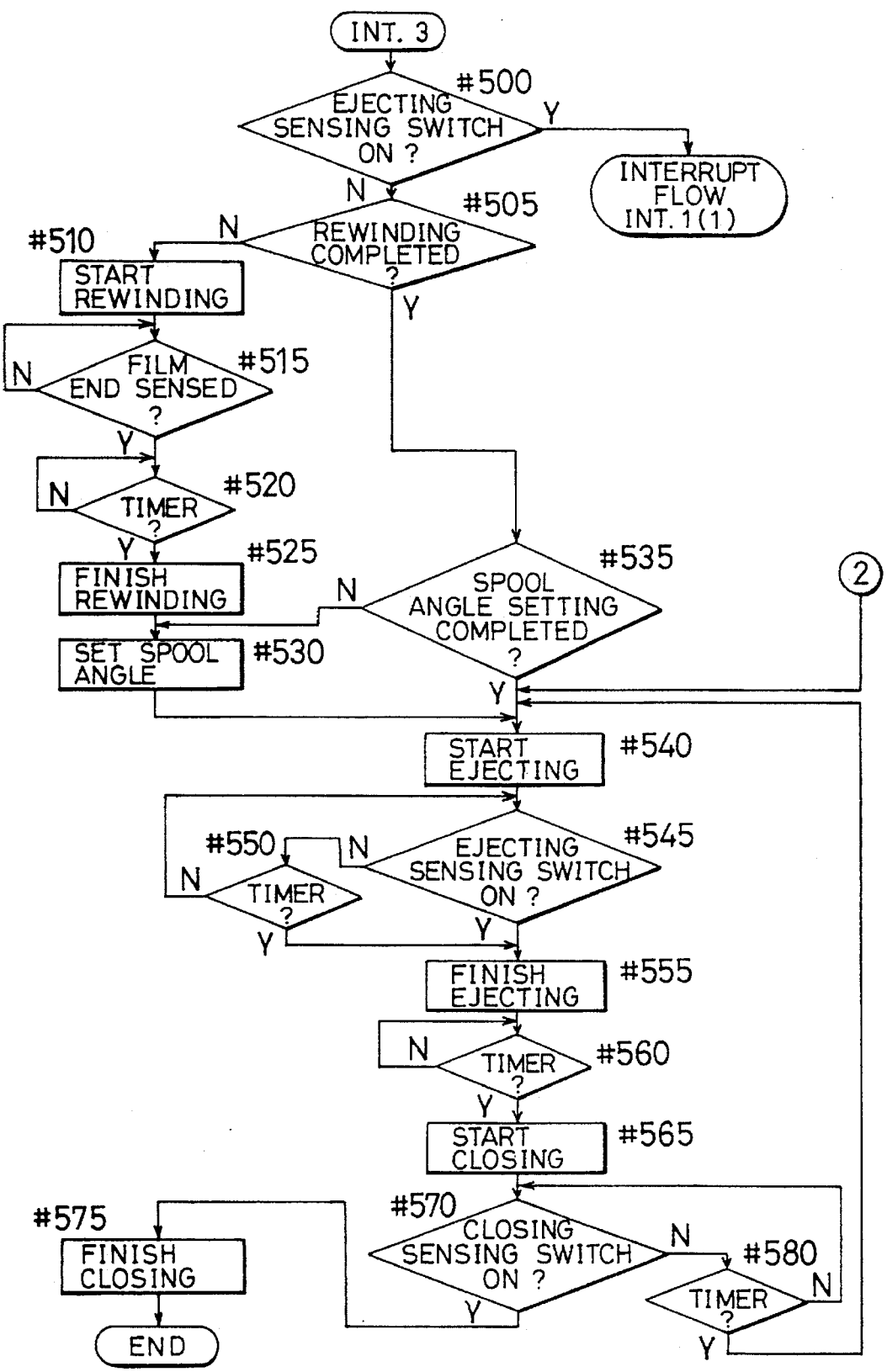
FIG. 15 is a flowchart of a third interrupt operation of the first embodiment of the present invention.

In a third interrupt operation (interrupt flow INT.3) of FIG. 15, when the ejecting sensing switch 17 is ON (at step #500), it is determined that the cartridge holder 23 is ejected, and the first interrupt (interrupt flow INT.1) of FIG. 8 is applied. This is in order to close the ejected cartridge unit 23 as described later, and means that the ejecting switch 20 also functions as an automatic closing button for the cartridge holder 23.

Figure 9:
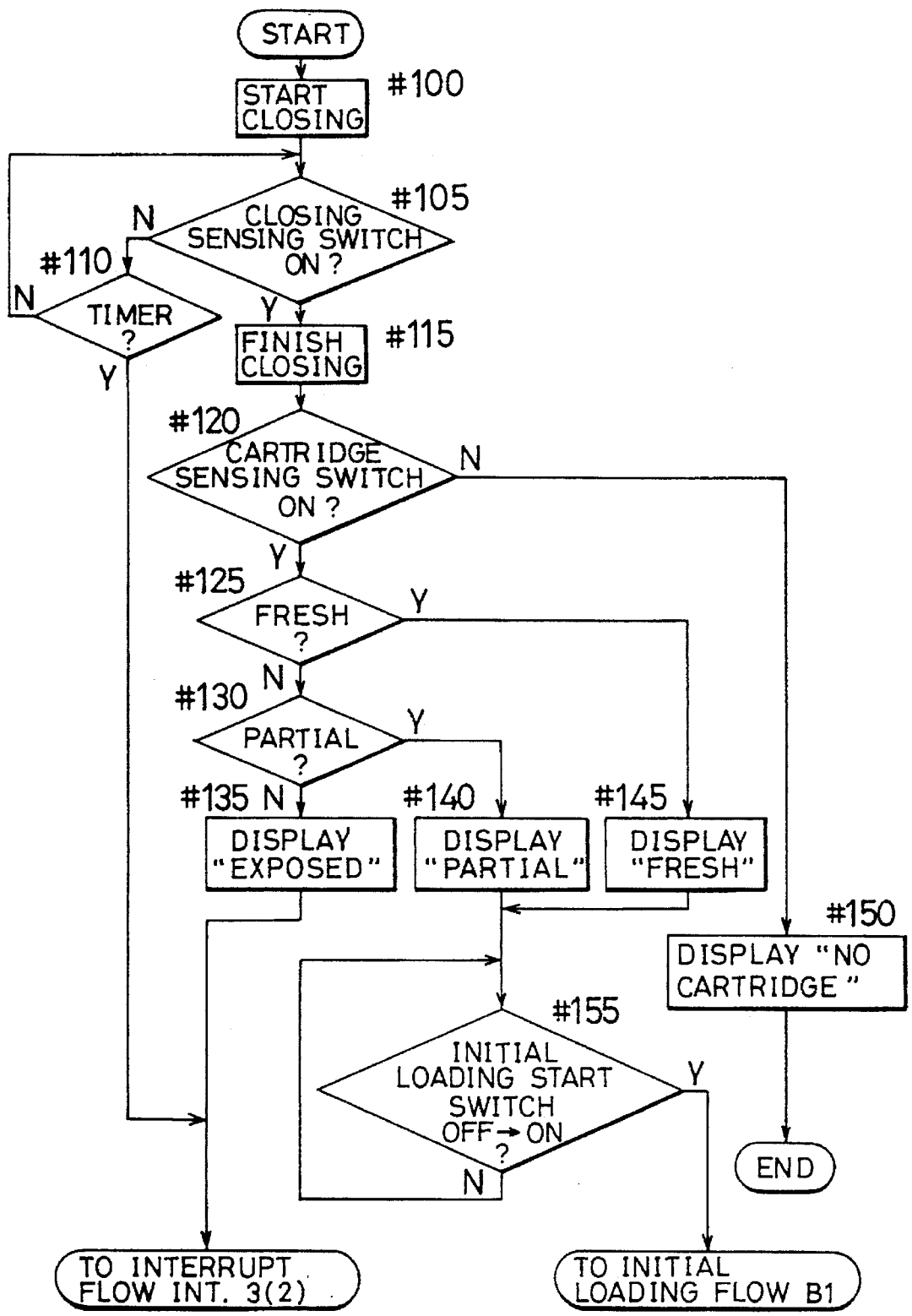
FIG. 9 is a flowchart of a first closing operation of the first embodiment of the present invention.
Figure 10:
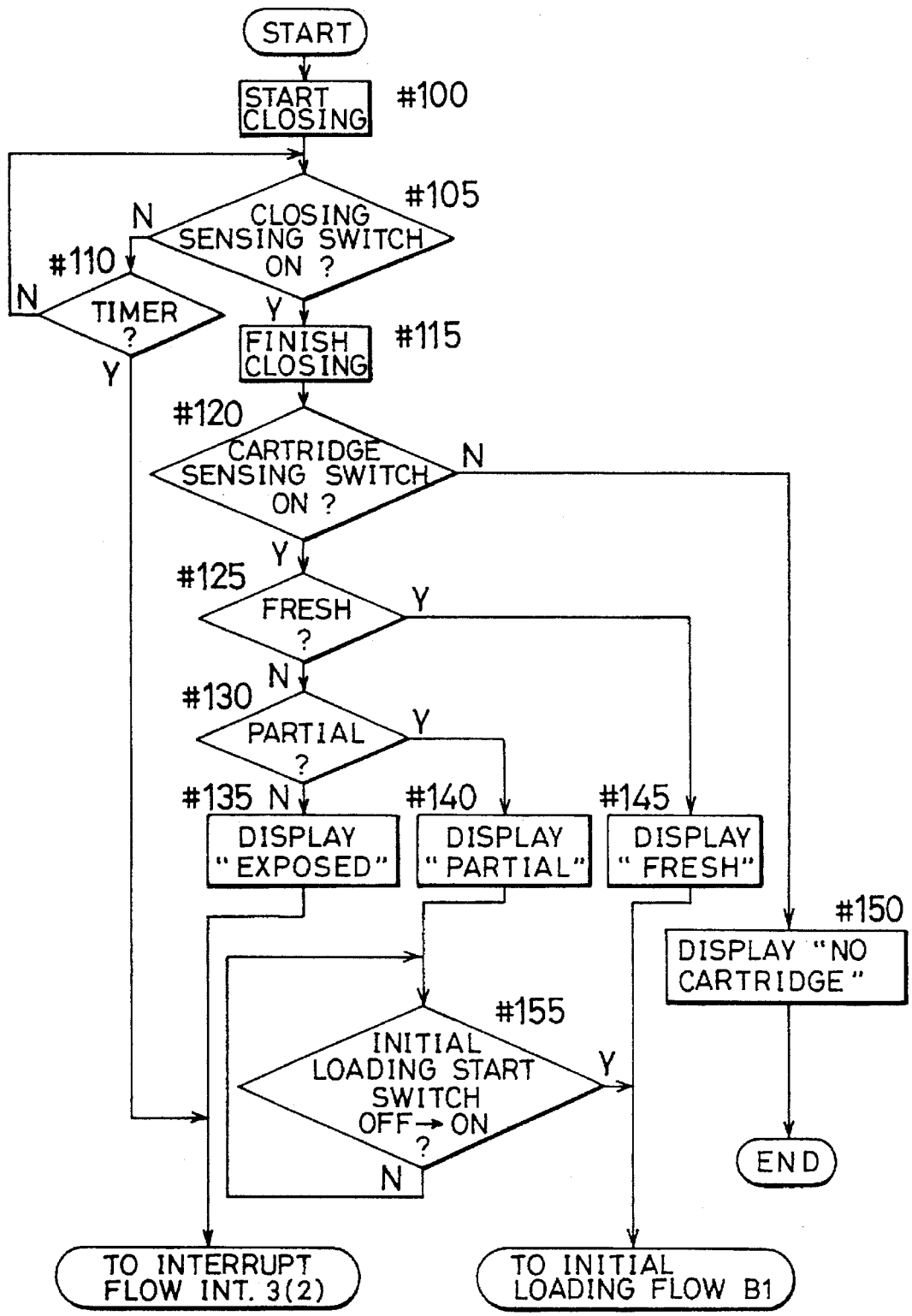
FIG. 10 is a flowchart of a second closing operation of the first embodiment of the present invention.
Figure 11:
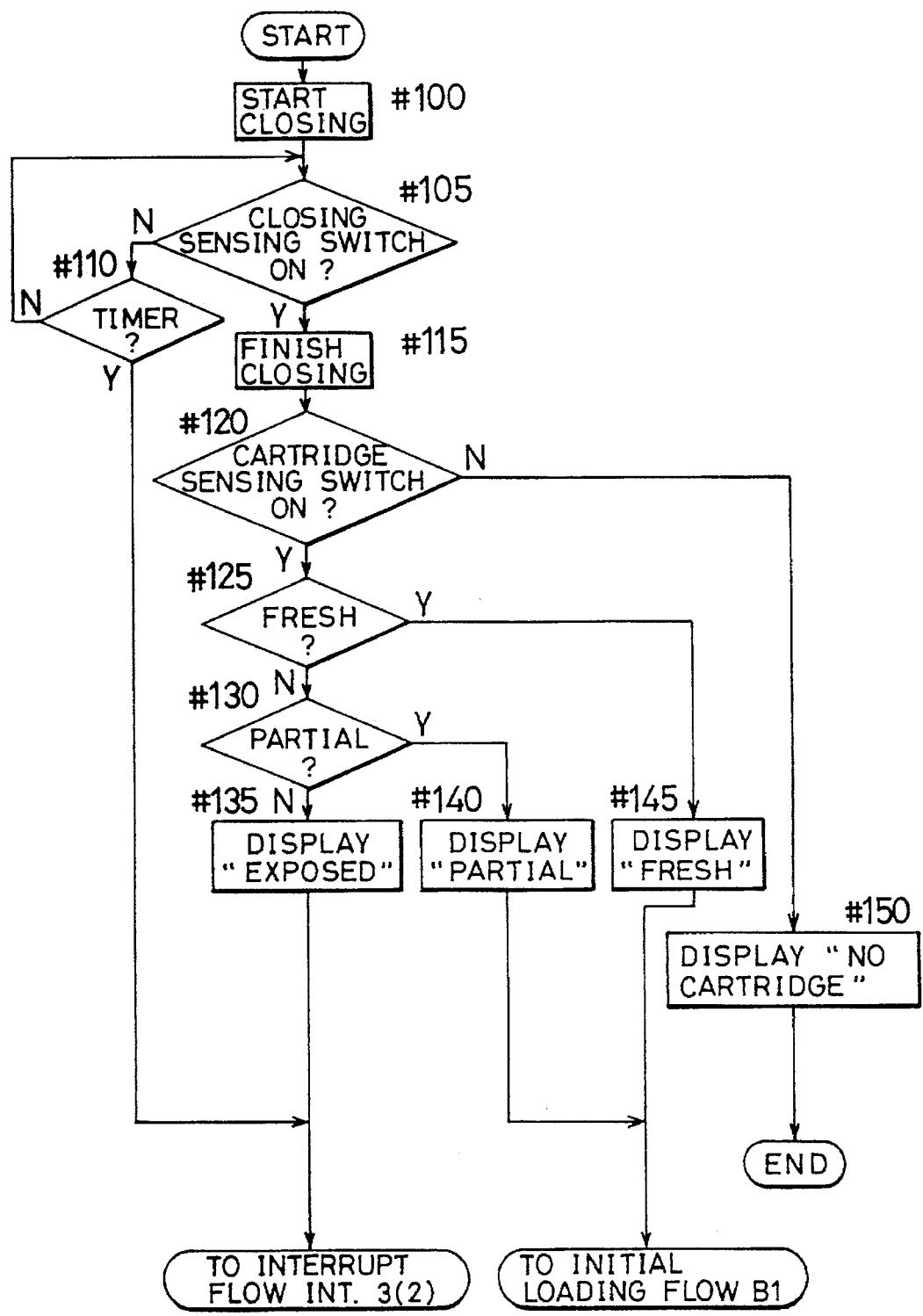
FIG. 11 is a flowchart of a third closing operation of the first embodiment of the present invention.

In the interrupt flow INT.1, first, whether the set mode is Mode 3 or not is determined at step #10. When the set mode is Mode 3, the process proceeds to a closing flow A3 (FIG. 11). When the set mode is not Mode 3, the process proceeds to step #20 to determine whether the set mode is Mode 2 or not. When the set mode is Mode 2, the process proceeds to a closing flow A2 (FIG. 10). When the set mode is not Mode 2, it is determined that the set mode is Mode 1, and the process proceeds to a closing flow A1 (FIG. 9).

Table 1 shows a first closing operation (corresponding to the closing flow A1 of FIG. 9), a second closing operation (corresponding to the closing flow A2 of FIG. 10) and a third closing operation (corresponding to the closing flow A3 of FIG. 11) which are performed when the film cartridge 1 is loaded in the camera body 2 when Mode 1, Mode 2 and Mode 3 have been set, respectively. Table 2 shows operations (FIG. 14) performed after the rewinding of the film is completed when Mode A and Mode B have been set, respectively.

The first closing operation is described with reference to the flowchart of FIG. 9. When it is determined in the above-described interrupt flow INT.1 that the set mode is Mode 1, the first closing operation is started according to the closing flow A1.

First, by driving the ejecting motor 6, the closing operation of the cartridge holder 23 is started (step #100). Then, at step #105, whether the closing sensing switch 16 is ON or OFF is determined. When it is ON, since the cartridge holder 23 is at the closed position as shown in FIG. 6, the electing motor 6 is stopped at step #115 to finish the closing. Then, the process proceeds to step #120.

When it is determined that the closing sensing switch 16 is OFF, since the cartridge holder 23 is still ejected (FIGS. 4 and 5) or is being closed, the process proceeds to step #110, where whether or not a predetermined period of time has been elapsed since the closing is started (at step #100) is determined based on a timer. When the predetermined period of time has not been elapsed, the process returns to step #105. When the closing is not sensed even though the predetermined period of time has been elapsed, it is determined that an overload is applied, and the process proceeds to the ejecting operation (interrupt flow INT.3(2)).

Thus, when the closing is not sensed even though the predetermined period of time has been elapsed since the closing operation is started, it is determined that the cartridge holder 23 is overloaded, for example, because of a finger nipped therein during the closing operation, and the cartridge holder 23 is ejected (i.e. the process proceeds to the ejecting operation), thereby preventing the breakage of members such as the ejecting motor 6, the cartridge holder 23 and the cartridge holder driving gear 29.

At step #120, whether the cartridge sensing switch 18 is ON or OFF is determined. When it is OFF, since the film cartridge 1 is not loaded, the process proceeds to step #150 to display "NO CARTRIDGE" on the liquid crystal display 8. Then, the process ends. When the cartridge sensing switch 18 is ON, the process proceeds to step #125 to determine whether the film cartridge 1 is in the fresh condition or not.

When the film cartridge 1 is in the fresh condition, the process proceeds to step #145 to display "FRESH" on the liquid crystal display 8. Then, the process proceeds to step #155. When the film cartridge 1 is not in the fresh condition, the process proceeds to step #130 to determine whether the film cartridge 1 is in the partial condition or not.

When the film cartridge 1 is in the partial condition, the process proceeds to step #140 to display "PARTIAL" on the liquid crystal display 8. Then, the process proceeds to step #155. When the film cartridge 1 is not in the partial condition, it is determined that the film cartridge 1 is in the exposed condition, and the process proceeds to step #135 to display "EXPOSED" on the liquid crystal display 8. Then, the process proceeds to the ejecting operation (interrupt flow INT.3(2) of FIG. 15). The ejecting operation may be started after the ejecting switch 20 is turned ON.

At step #155, whether the condition of the initial loading start switch 14 has been changed from OFF to ON or not is determined. After waiting until the condition of the initial loading start switch 14 is changed to ON, the process proceeds to initial loading (initial loading flow B1 of FIG. 12).

The determinations of condition of the film cartridge 1 at steps #125 and #130 are made based on film data read from the information disk 3 by the information reading photoreflector 10.

At steps #135 to #150, instead of the displays provided in this embodiment, other forms of displays such as figures, marks, pictorial symbols and Japanese words representing the same contents may be provided.

Referring to the flowchart of FIG. 10, the second closing operation will be described. When it is determined in the interrupt flow INT.1 that the set mode is Mode 2, the second closing operation is started according to the closing flow A2. In FIG. 10, steps at which the same operations as those of the steps of FIG. 9 are given the same step numbers and no detailed description thereof will be given. The second closing operation is the same as the first closing operation except that after the display is provided at step #145, the process directly proceeds to the initial loading (the initial loading flow B1 of FIG. 12) without executing the step #155. Thus, only in the partial condition, the process waits until the initial loading start switch 14 is turned ON before the initial loading operation is started.

Referring to the flowchart of FIG. 11, the third closing operation will be described. When it is determined in the interrupt flow INT.1 that the set mode is Mode 3, the third closing operation is started according to the interrupt flow A3. In FIG. 11, steps at which the same operations as those of the steps of FIG. 9 are given the same step numbers and no detailed description thereof will be given. The third closing operation is the same as the first closing operation except that after the displays are provided at steps #140 and #145, the process directly proceeds to the initial loading (the initial loading flow B1 of FIG. 12) without executing the step #155 (FIG. 9). Thus, in both the partial condition and the fresh condition, the process does not wait until the initial loading start switch 14 is turned ON before the initial loading operation is started.

Figure 12:
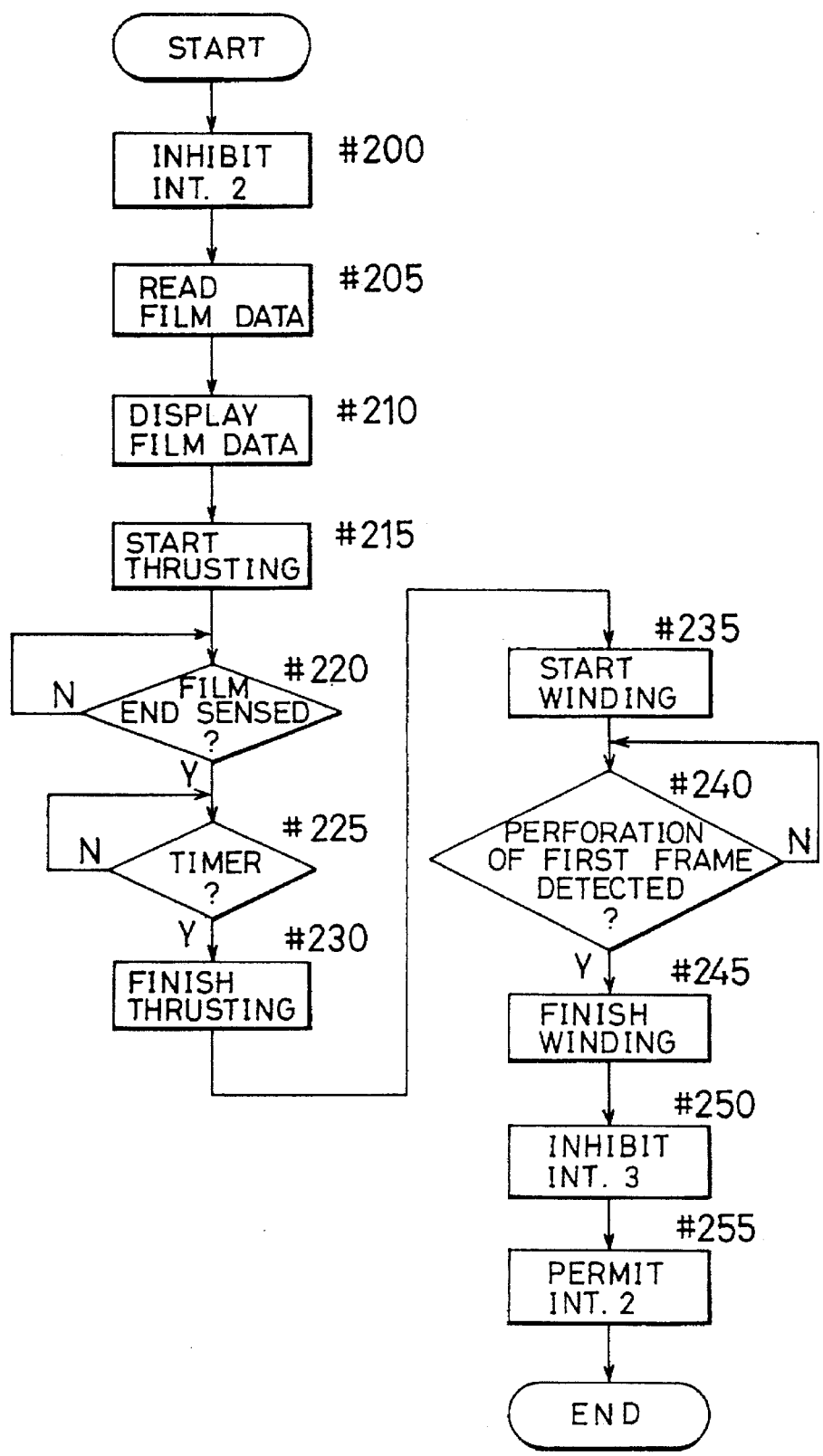
FIG. 12 is a flowchart of an initial loading operation of the first embodiment of the present invention.

Referring to the flowchart of FIG. 12, the initial loading operation will be described. After the display representative of the fresh or partial condition is provided in the above-described first to third closing flows A1 to A3, the initial loading operation is started according to the initial loading flow B1. The initial loading operation is not performed when the film cartridge 1 is in the exposed condition. This is because no un-exposed frames are left.

First, at step #200, a second interrupt according to the interrupt flow (taking flow) INT.2 (FIG. 13) is inhibited to thereby inhibit the taking operation. At Step #205, the information disk 3 of the film cartridge 1 is driven in the rewinding direction (i.e. a direction opposite to the thrusting direction) by the film transporting motor 5 to read film data by the information reading photoreflector 10. At step #210, the information read out from the information disk 3 is displayed on the liquid crystal display 8.

Then, at step #215, the thrusting operation is started by driving the spool 2 by the film transporting motor 5. Then, at step #220, whether or not the end of the film is sensed by the film transporting photoreflector 9 is determined. At this time, the end of the film is sensed when the end of the film passes the detection portion of the film transporting photoreflector 9 to change the level of the output of the photoreflector 9 from high to low for the first time.

After waiting until the end of the film is sensed, the process proceeds to step #225. At step #225, whether or not a predetermined period of time has been elapsed since the end of the film is sensed is determined based on a timer to continue the thrusting operation for the predetermined period of time. Thereby, the end of the film reaches the winding spool 33. Then, at step #230, the film transporting motor 5 is stopped to finish the thrusting operation.

Then, at step #235, the winding of the film is started by driving the film transporting motor 5. At step #240, whether or not the perforation of the first frame of the film is detected by the film transporting photoreflector 9 is determined. After waiting until the perforation of the first frame is detected, the process proceeds to step #245. At step #245, the film transporting motor 5 is stopped to finish the winding of the film. Then, the process proceeds to step #250.

At step #250, an interrupt according to the interrupt flow (taking flow) INT.3 (FIG. 15) is inhibited to thereby inhibit the ejecting operation. This is because if the ejecting operation is performed under this condition, the portion of the film which is outside the cartridge body 1a is damaged or exposed. Then, at step #255, the interrupt according to the interrupt flow (taking flow) INT.2 (FIG. 13) is permitted to thereby permit the taking operation. Then, the initial loading operation is finished.

Figure 13:
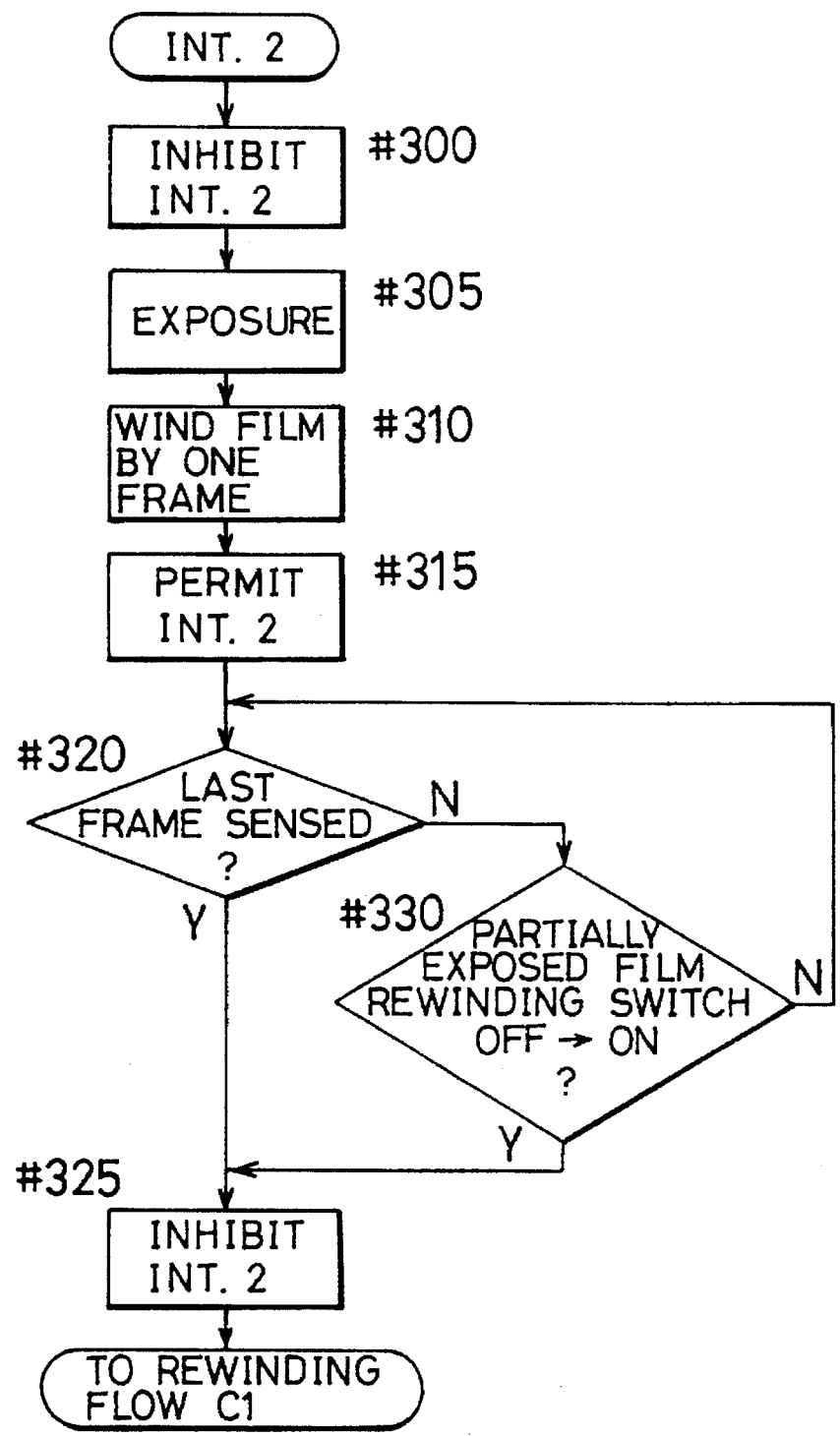
FIG. 13 is a flowchart of a second interrupt operation of the first embodiment of the present invention.

Referring to the flowchart of FIG. 13, a second interrupt operation in a taking operation will be described. When the condition of the release switch 19 is changed from OFF to ON, the second interrupt operation is started according to the interrupt flow (taking flow) INT.2.

First, at step #300, the second interrupt according to the interrupt flow (taking flow) INT.2 (FIG. 13) is inhibited to thereby inhibit the interrupt (interrupt of the taking operation) applied by the release switch 19. Then, at step #305, the exposure operation is performed. At step #310, the film transporting motor 5 is driven to start the winding operation, and when the film transporting photoreflector 9 senses that the film is wound by one frame, the film transporting motor 5 is stopped. Then, at step #315, the second interrupt according to the interrupt flow (taking flow) INT.2 (FIG. 13) is permitted to thereby permit the interrupt (interrupt of the taking operation) by the release switch 19.

Figure 14:
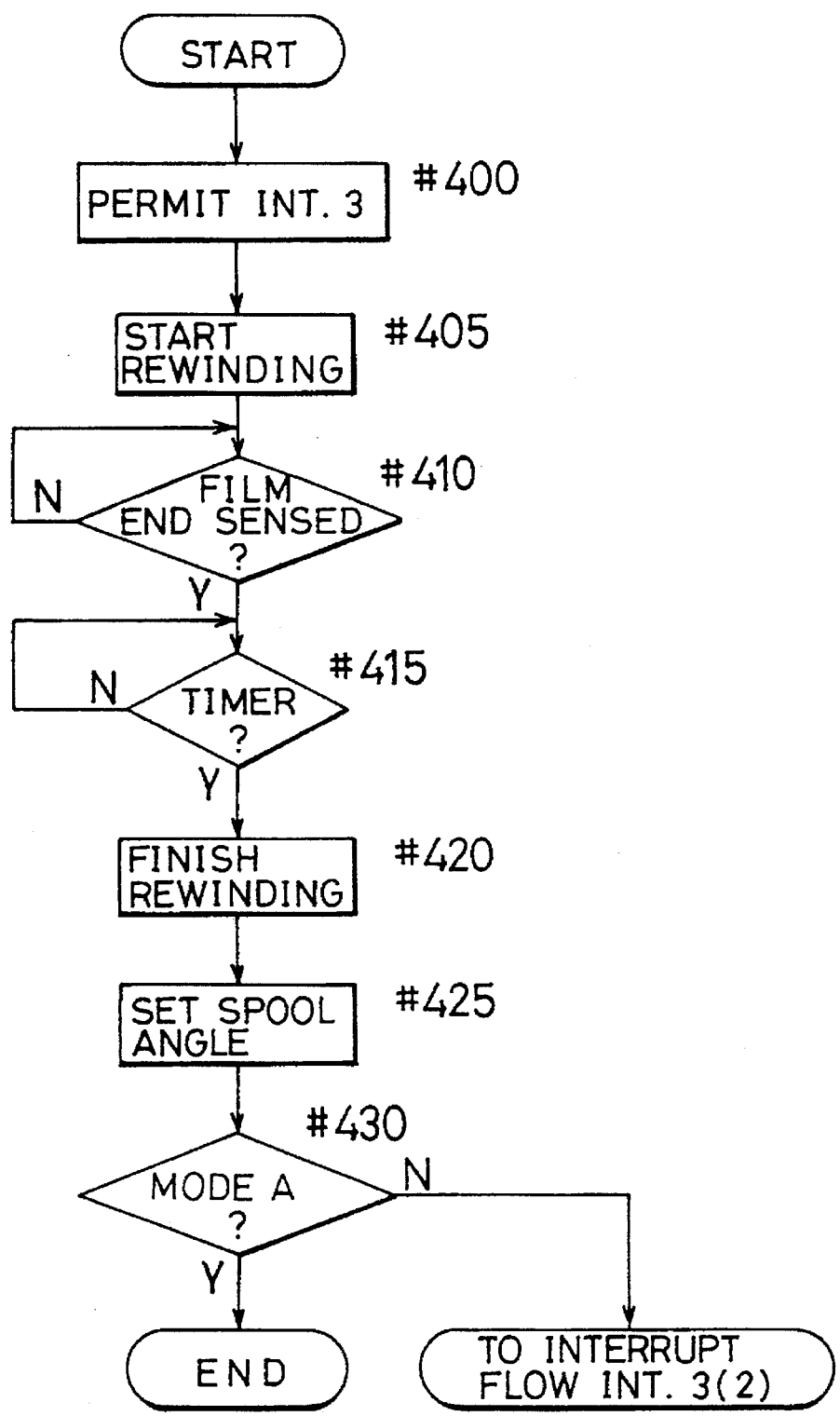
FIG. 14 is a flowchart of a rewinding operation of the first embodiment of the present invention.

Then, at step #320, whether or not the last frame of the film is sensed by the film transporting photoreflector 9 is determined. When the last frame is not sensed, at step #330, whether or not the condition of the partially exposed film rewinding switch 15 is changed from OFF to ON is determined. When the switch 15 is OFF, the process returns to step #320 so that the interrupt by the release switch 19 is applied after the taking operation, or the process waits until the partially exposed film rewinding switch 15 is turned ON. When the switch 15 is turned ON, the process proceeds to step #325, and the second interrupt by the release switch 19 is inhibited. Then, the process proceeds to a rewinding flow C1 (FIG. 14).

Referring to the flowchart of FIG. 14, the rewinding operation will be described. When the interrupt flow INT.2 (FIG. 13) is finished, the film rewinding operation is started according to the rewinding flow C1.

First, at step #400, the third interrupt according to the interrupt flow (taking flow) INT.3 (FIG. 15) executed when the ejecting switch 20 is turned ON is permitted. Since even though the third interrupt is permitted under this condition, the cartridge holder 23 is not ejected until the rewinding is completed as described later (step #505 of FIG. 15), the cartridge holder 23 is never ejected when a part of the film is outside the cartridge body 1a.

Then, at step #405, the film transporting motor 5 is driven to start the rewinding of the film. At step #410, whether or not the end of the film is sensed by the film transporting photoreflector 9 is determined. At this time, the end of the film is sensed when the end of the film passes the detection portion of the film transporting photoreflector 9 to change the level of the output of the photoreflector 9 from low to high and the level remains high for a predetermined period of time.

After waiting until the end of the film is sensed, the process proceeds to step #415. At step #415, whether or not a predetermined period of time has been elapsed since the end of the film is sensed is determined based on a timer to continue the rewinding operation for the predetermined period of time. Thereby, the end of the film enters the cartridge body 1a. Then, at step #420, the film transporting motor 5 is stopped to finish the rewinding operation.

Then, at step #425, the film transporting motor 5 is driven to rotate the spool 2 of the film cartridge 1. The information reading photoreflector 10 detects the angle of rotation of the spool 2 to stop the spool 2 at a predetermined position (a position particular to each condition of the film cartridge 1) (i.e. spool angle is set). At step #430, whether the set mode is Mode A or not is determined. When the set mode is Mode A, the operation is finished to wait for the interrupt by the ejecting switch 20. When the set mode is not Mode A, it is determined that the set mode is Mode B, and the process proceeds to the ejecting operation which is the third interrupt operation (interrupt flow INT.3 (2) of FIG. 15).

Referring to the flowchart of FIG. 15, the third interrupt operation which is the ejecting operation will be described. When the condition of the ejecting switch 20 is changed from OFF to ON, the third interrupt operation is started according to the interrupt flow (ejecting flow) INT.3.

First, at step #500, whether the ejecting sensing switch 17 is ON or OFF is determined. When the switch 17 is ON, it is determined that the cartridge holder 23 is ejected, and the process proceeds to the first interrupt (interrupt flow INT.1 (1)) of FIG. 8 to start the closing operation. When the switch 17 is OFF, the ejecting operation from step #505 is performed.

As described above, the interrupt flow INT.3 is started by the change in condition of the ejecting switch 20 from OFF to ON. When it is determined at step #500 that the ejecting sensing switch 17 is ON, the closing operation is started, and when it is determined that the switch 17 is OFF, the ejecting operation is started. That is, only by operating the button of the ejecting switch 20, the cartridge holder 23 is controlled so as to be closed when it is open (automatic ejecting) and opened when it is closed (automatic closing).

Compared to a camera provided with an automatic ejecting button and an automatic closing button to perform the ejecting and closing operations by the respective buttons, the camera of this embodiment is simple in structure since these operations are performed by the same button (i.e. only the ejecting switch 20 is provided). Moreover, the alternative selection between automatic ejecting and automatic closing is made by operating the same button (i.e. ejecting switch 20), an error never occurs such that the ejecting button or the closing button is operated by mistake. As a result, the ejecting and closing operations are performed without failure.

Then, at step #505, whether the rewinding of the film has been completed or not is determined. When the rewinding has not been completed, the rewinding is started by the film transporting motor 5 (step #510), and the process waits until the end of the film is sensed by the film transporting photoreflector (step #515). At step #520, whether or not a predetermined period of time has been elapsed since the end of the film is sensed is determined based on a timer to continue the rewinding operation for the predetermined period of time. Thereby, the end of the film enters the cartridge body 1a. Then, at step #525, the film transporting motor 5 is stopped to finish the rewinding operation. At step #530, the spool angle is set. At step #540, the ejecting operation is started.

When it is determined at step #505 that the rewinding has been completed, at step #535, whether the spool angle setting has been completed or not is determined. When the spool angle setting has not been completed, at step #530, the spool angle is set, and at step #540, the ejecting operation is started. When it is determined that the spool angle setting has been completed, the process proceeds to step #540 to start the ejecting operation.

The process proceeds to step #540 to start the ejecting operation also in the following cases: in the previously-described first, second and third closing flows A1 (FIG. 9), A2 (FIG. 10) and A3 (FIG. 11), when the closing sensing switch 16 is not turned ON even after the predetermined period of time has elapsed in the closing operation and when the film cartridge 1 is in the exposed condition; and in the rewinding flow C1 (FIG. 14), when it is determined that the set mode is Mode B at step #430.

When Mode B is set, the cartridge holder 23 is ejected in succession to the completion of the film rewinding operation so that the film cartridge 1 is detachable. Therefore, even a beginner will find out that all the frames have been exposed and the replacement of the film cartridge 1 is necessary. Since the cartridge holder 23 is ejected, the user will easily find out where the film cartridge 1 is detached and attached.

Thus, the camera of this embodiment is designed to urge the replacement of the film cartridge in a manner which even a beginner would understand easily. Moreover, the number of operations which the user has to perform is minimized so that a beginner may use the camera with ease.

A camera of a structure where the cartridge chamber is opened by using a driving means is disclosed in Japanese Laid-open Patent Application No. H4-80735. In this prior art camera, however, since the ejecting operation is performed by operating a switch to drive the driving means, it is not easy for a beginner to judge when the film cartridge should be replaced and to find out where the film cartridge is detached and attached. On the contrary, according to the present embodiment, since the ejecting operation is started in succession to the completion of the rewinding operation without any switch operation, the replacement of the film cartridge is easy even for a beginner.

In the rewinding flow C1 of FIG. 14, the interrupt (interrupt flow INT.3) by the ejecting switch 20 is permitted just before the start of the rewinding (step #400). However, when the ejecting switch 20 is depressed during rewinding or spool angle setting, whether the rewinding and the spool angle setting have been completed or not is determined as described above and the ejecting operation is performed after the rewinding and the spool angle setting have been completed. Therefore, the ejecting operation is never performed when a part (e.g. film leader) of the film is outside the cartridge body 1a or when the spool angle setting has not been completed. As a result, the spool angle setting and the ejecting operation are performed without failure.

Returning to FIG. 15, at step #545, whether the ejecting sensing switch 17 is ON or OFF is determined. When the electing sensing switch 17 is ON (FIGS. 4 and 5), it is determined that the cartridge holder 23 is ejected. Then, the process proceeds to step #555, where the ejecting motor 6 is stopped to finish the ejecting operation.

When it is determined at step #545 that the ejecting sensing switch 17 is OFF, since the cartridge holder 23 is at the closed position shown in FIG. 6 or is being ejected, whether or not a predetermined period of time has elapsed since the ejecting is started (step #540) is determined based on a timer (step #550). When the predetermined period of time has not been elapsed, the process returns to step #545. When the ejecting sensing switch 17 is not turned ON even after the predetermined period of time has been elapsed since the ejecting is started, the ejecting motor 6 is stopped to finish the ejecting operation (step #555).

Thus, when the ejecting is not sensed even after the predetermined period of time has been elapsed since the ejecting is started, it is determined that the cartridge holder 23 is overloaded in the middle of the ejecting operation, and the ejecting operation is forcibly finished, thereby preventing the breakage of members such as the ejecting motor 6, the cartridge holder 23 and the cartridge holder driving gear 29.

Then, after waiting until a predetermined period of time has been elapsed since the ejecting is finished at step #560, the process proceeds to step #565, where the ejecting motor 6 is driven to start the closing of the cartridge holder 23. By controlling based on a timer so that the cartridge chamber is automatically closed when the predetermined period of time has been elapsed since the ejecting operation is finished, the intrusion of dust through an opening between the cartridge holder 23 and the camera body 22 is prevented.

At step #570, whether the closing sensing switch 16 is ON or OFF is determined. When the switch 16 is ON, the ejecting motor 6 is stopped to finish the closing operation of the cartridge holder 23 (step #575), thereby finishing the interrupt operation. When the closing sensing switch 16 is OFF, the process proceeds to step #580, where whether or not a predetermined period of time has been elapsed since the closing is started (step #565) is determined based on a timer. When the predetermined period of time has not been elapsed, the process returns to step #570. When the closing sensing switch 16 is not turned OFF even after the predetermined period of time has been elapsed, the process returns to step #540 to start the ejecting operation.

It is preferable to disable other operation members during the ejecting operation of the cartridge holder 23. This is because during the ejecting operation, it is unnecessary to operate the other members to perform taking preparation operations. Moreover, the power consumption is reduced by disabling the other members during the ejecting operation.

As described above, according to the first embodiment, the cartridge holder 23 is closed and ejected by driving the motor, and the user operates the mode selecting switches 11 and 12 to select whether the thrusting operation is automatically started after the closing operation is finished or the thrusting operation is started by operating a switch, and whether the ejecting operation is automatically started after the rewinding is completed or the ejecting operation is started by operating a switch. Thus, the camera may be operated in accordance with the user's taste or habit.

A camera has been proposed where the thrusting operation is automatically started (automatic loading) when the film in the attached film cartridge is un-exposed. However, for some users, the operation of this camera may not be as easy as that of the camera of the present embodiment since the above-mentioned selections cannot be made.

Figure 16:
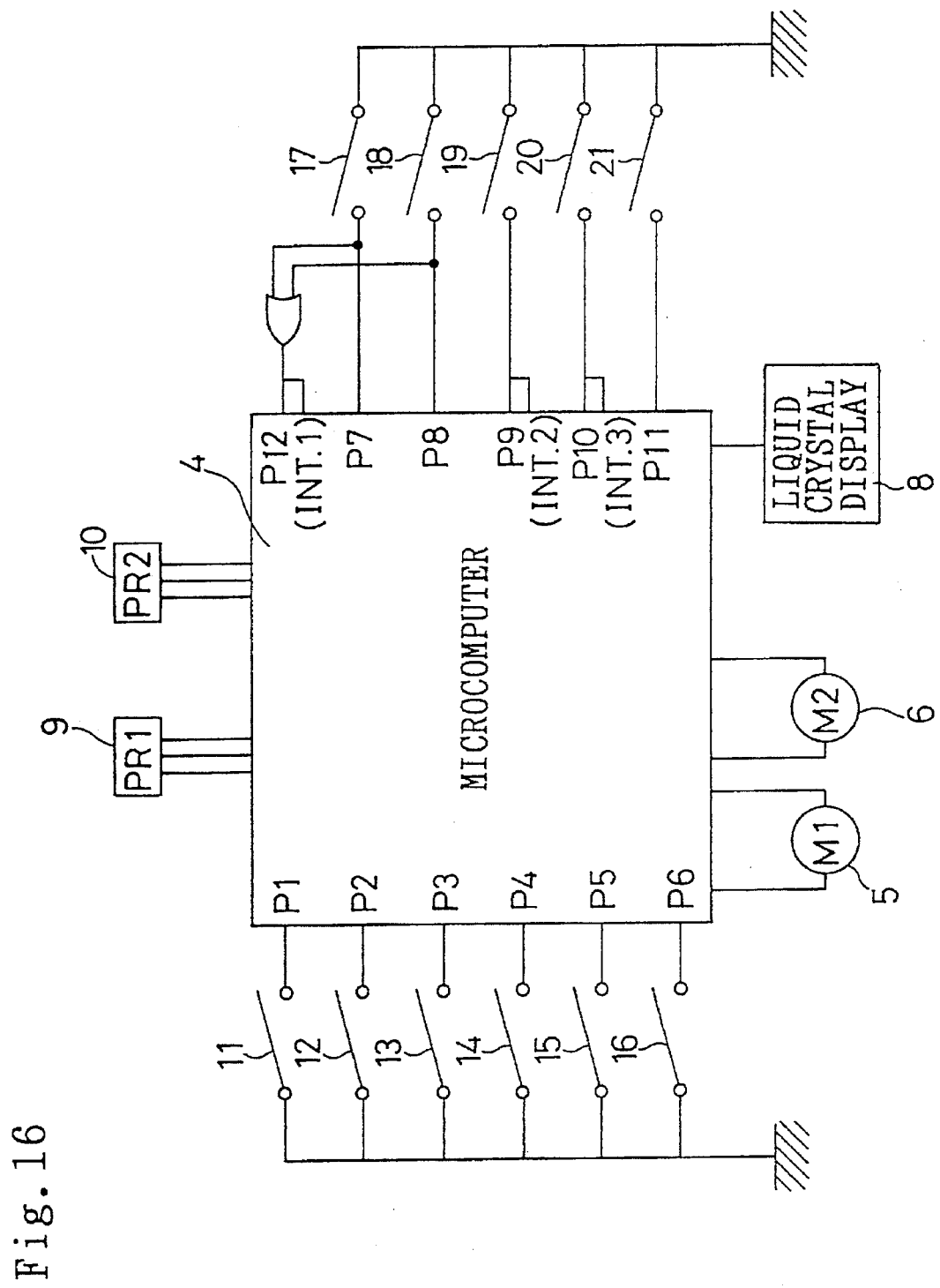
FIG. 16 is a circuit diagram of a second embodiment of the present invention.
Figure 17:
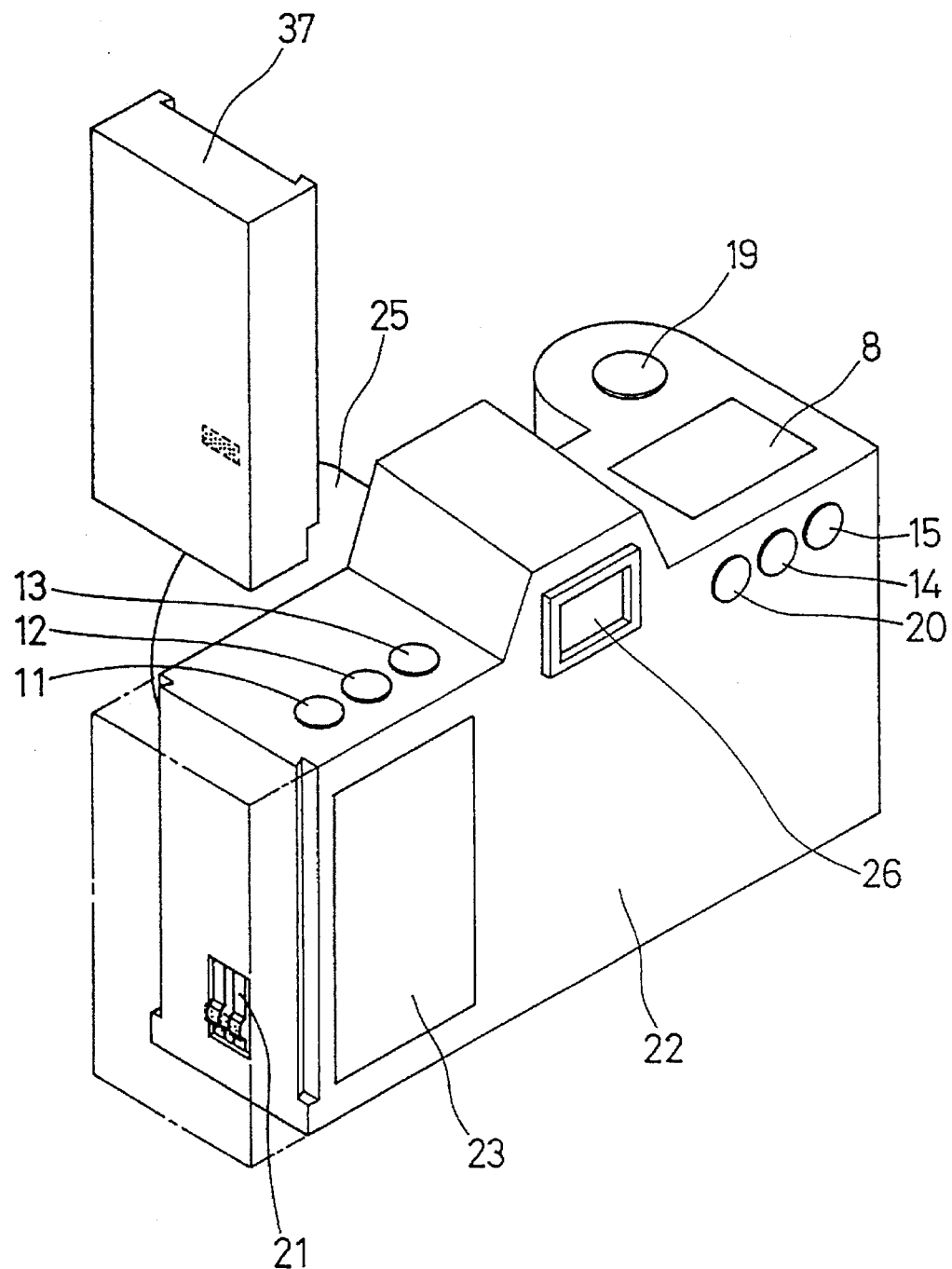
FIG. 17 is a perspective view showing the exterior of the second embodiment of the present invention.

Referring now to FIGS. 16 and 17, a camera employing a second embodiment of the present invention will be described. FIG. 16 is a circuit diagram of the camera employing the second embodiment. FIG. 17 is a perspective view of the exterior of the camera. In FIGS. 16 and 17, the same elements as those of the above-described first embodiment are given the same reference numerals and designations, and no detailed description thereof will be given.

As shown in FIGS. 16 and 17, the structure of the second embodiment is the same as that of the first embodiment except that an accessory sensing switch 21 (connected to a terminal P11) is provided. The accessory sensing switch 21 is turned ON when an accessory 37 such as an integrated circuit (IC) card is attached to the camera body 22 (at a position shown by the alternate long and short dash line in FIG. 17), whereby the microcomputer 4 causes the first mode selecting switch 11, the second mode selecting switch 12 and the mode entering switch 13 to function. Thus, the mode change is possible only when the accessory sensing switch 21 is ON.

Every time the microcomputer 4 senses that the condition of the first mode selecting switch 11 or the second mode selecting switch 12 is changed from OFF to ON, the microcomputer 4 changes the mode by selecting a mode in the order of Mode 1, Mode 2, Mode 3 and Mode 1 or in the order of Mode A, Mode B and Mode A, and displays the selected mode on the liquid crystal display 8. A mode is entered which is being selected when the condition of the mode entering switch 13 is changed from OFF to ON. When the accessory 37 is detached to turn OFF the accessory sensing switch 21, the mode change is inhibited. In this case, the camera operates in a mode selected lastly. As described above, excepting the operations associated with the accessory sensing switch 21, operations are controlled by the microcomputer 4 in a manner similar to the manner of the first embodiment.

As described above, according to the second embodiment, the cartridge holder 23 is closed and ejected by driving the motor, and only when an accessory such as an IC card is used, the user operates the mode selecting switches 11 and 12 to select whether the thrusting operation is automatically started after the closing operation is finished or the thrusting operation is started by operating a switch, and whether the ejecting operation is automatically started after the rewinding is completed or the electing operation is started by operating a switch. Thus, the camera may be operated in accordance with the user's taste or habit.

While in the second embodiment, the first mode selecting switch 11, the second mode selecting switch 12 and the mode entering switch 13 are each provided with a single function, switches having other functions may perform the functions of the switches 11, 12 and 13 when the accessory sensing switch 21 is ON.

Figure 18:
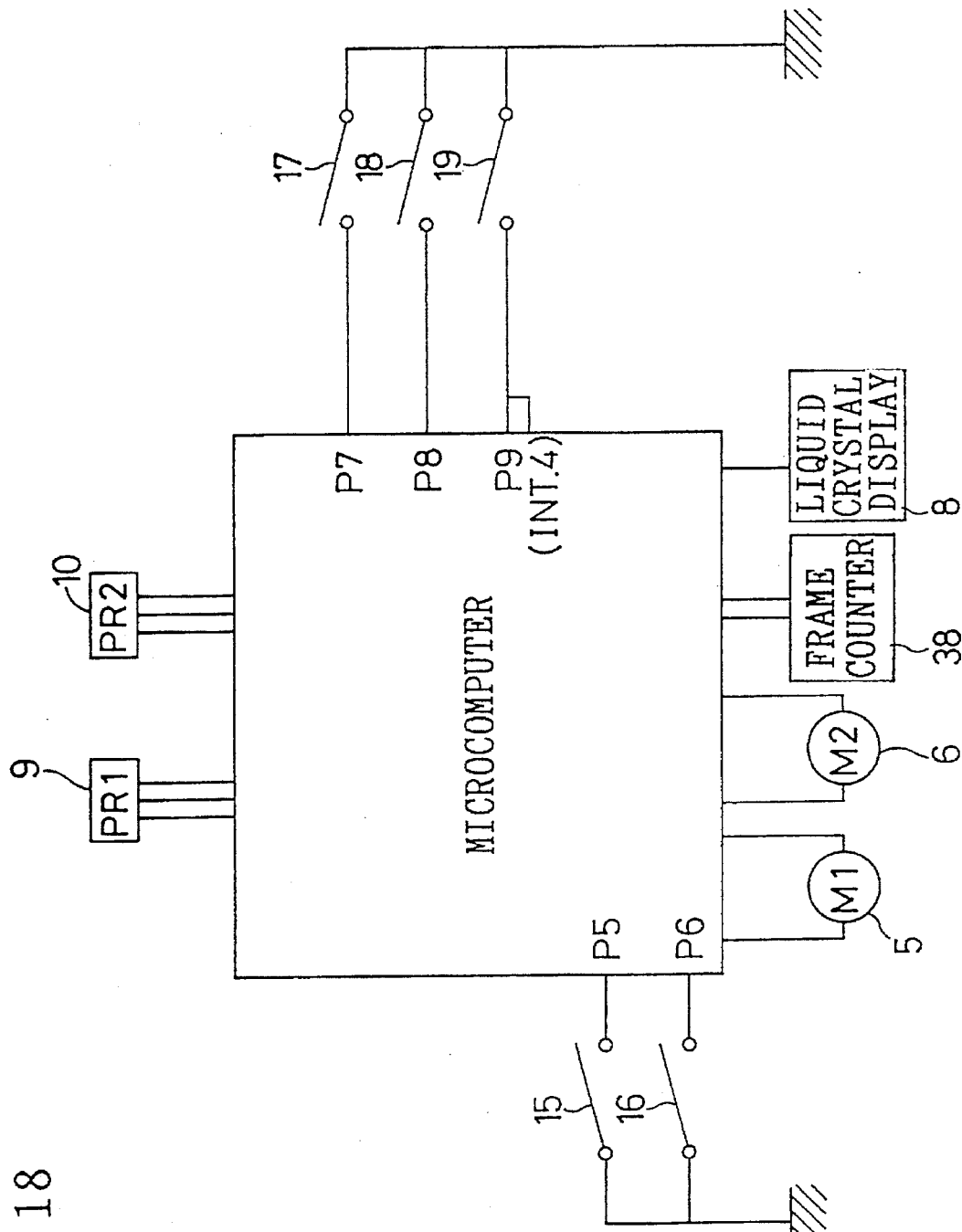
FIG. 18 is a circuit diagram of a third embodiment of the present invention.
Figure 19:
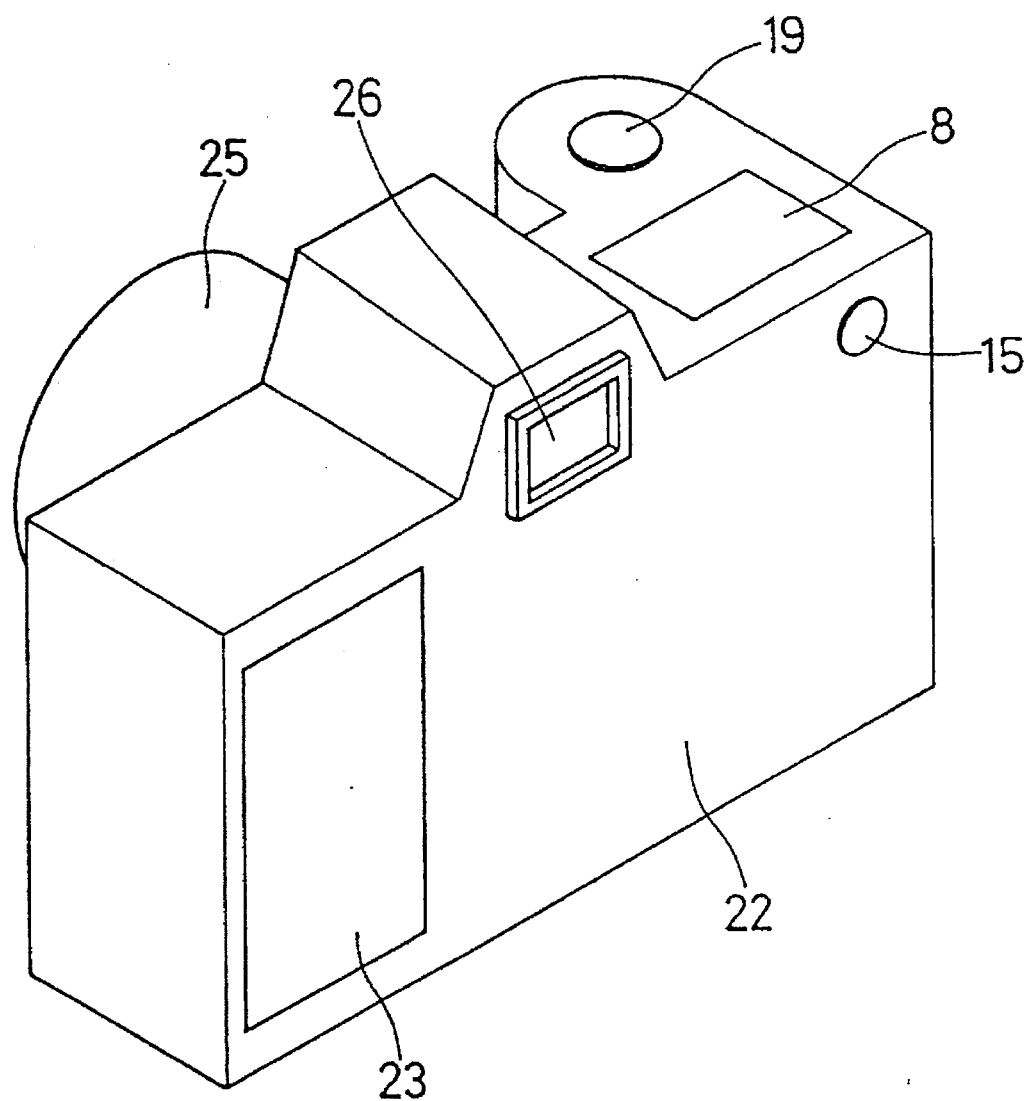
FIG. 19 is a perspective view showing the exterior of the third embodiment of the present invention.

Referring now to FIGS. 18 to 24, a camera employing a third embodiment of the present invention will be described. FIG. 18 is a circuit diagram of the camera employing the third embodiment. FIG. 19 is a perspective view of the exterior of the camera. In FIGS. 18 and 19, the same elements as those of the first embodiment is Given the same reference numerals and designations, and no detailed description thereof will be given.

As shown in FIGS. 18 and 19, the structure of the third embodiment is the same as that of the first embodiment except that the switches 11 to 14 and 20 of the first embodiment are not provided and that a frame counter 38 is provided which counts the number of frame to be exposed next.

Figure 20:
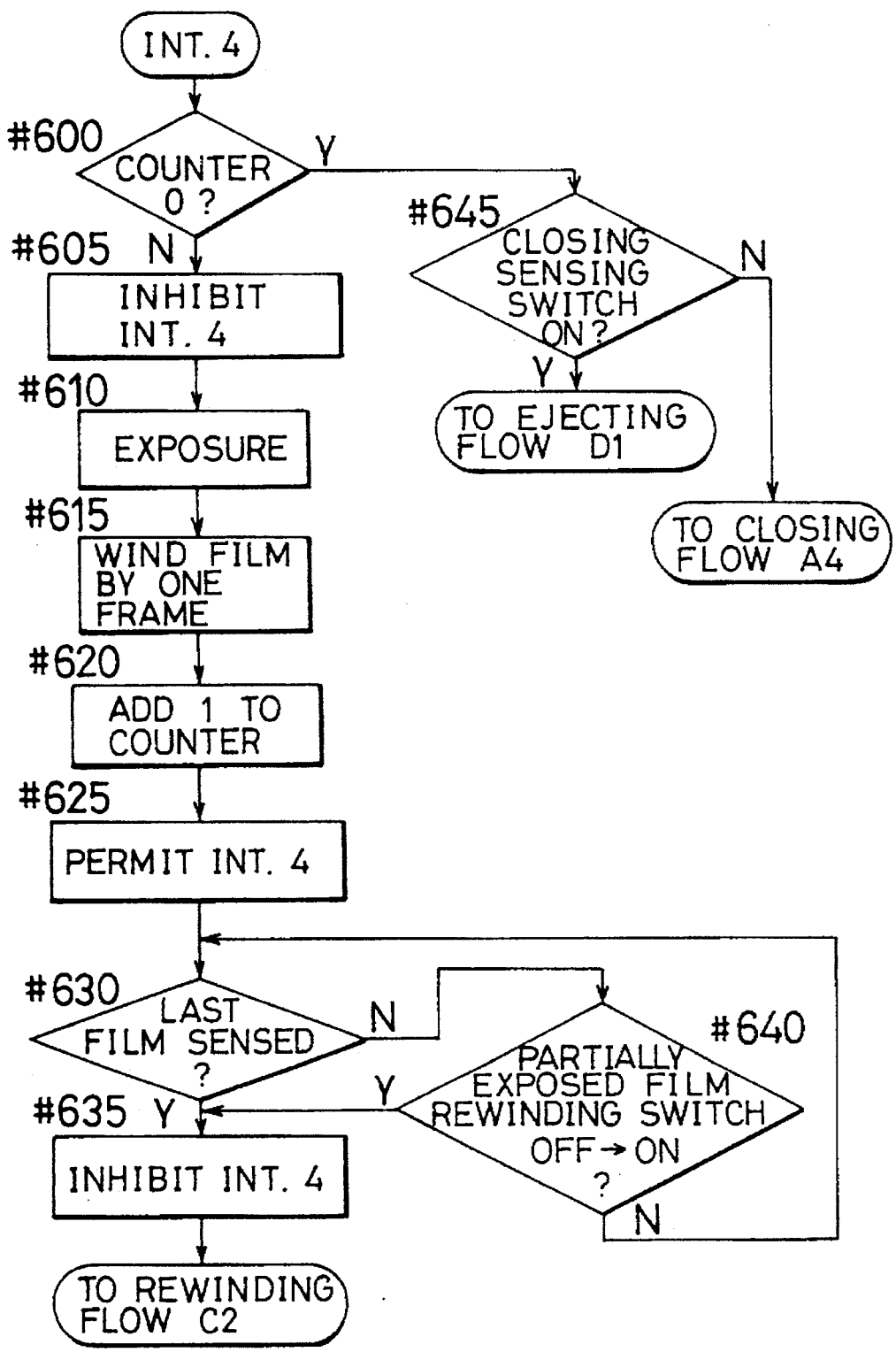
FIG. 20 is a flowchart of an interrupt operation of the third embodiment of the present invention.

FIGS. 20 to 24 are flowcharts of control operations of the third embodiment. Referring first to FIG. 20, an interrupt operation will be described. When the condition of the release switch 19 is changed from OFF to ON, an interrupt operation is started according to an interrupt flow INT.4.

First, at step #600, whether or not the frame counter 38 is 0 (i.e. a reset condition such as a condition where no film is loaded and a condition where the rewinding has been completed) is determined. When the film counter 38 is 0, the process proceeds to step #645. When the film counter 38 is not 0, it is determined that the camera is in the taking preparation condition, and the process proceeds to step #605. At step #645, whether the closing sensing switch 16 is ON or not is determined. When the switch 16 is ON, it is determined that the cartridge holder 23 is closed, and the process proceeds to an ejecting flow D1 (FIG. 24) to start the ejecting operation. When the switch 16 is OFF, the process proceeds to a closing flow A4 (FIG. 21) to start the closing operation.

Thus, in the third embodiment, while the release operation is started by the release switch 19 during taking, the ejecting operation or the closing operation is performed by the release switch 19 when taking is not performed (i.e. in the reset condition such as the condition where no film is loaded and the condition where the rewinding has been completed). With this arrangement, like the case of the ejecting switch 20 of the first embodiment, the camera is simple in structure, and the misoperation of the switch is prevented.

At step #605, the interrupt according to the interrupt flow INT.4 (FIG. 20) applied by the release switch 19 is inhibited. Then, at step #610, the exposure operation is performed. At step #615, the film transporting motor 5 is driven to start the winding operation, and when the film transporting photoreflector 9 senses that the film is wound by one frame, the film transporting motor 5 is stopped. Then, at step #620, 1 is added to the count number of the frame counter 38. At step #625, the interrupt (interrupt of the taking operation) according to the interrupt flow INT.4 (FIG. 20) applied by the release switch 19 is permitted.

Figure 21:
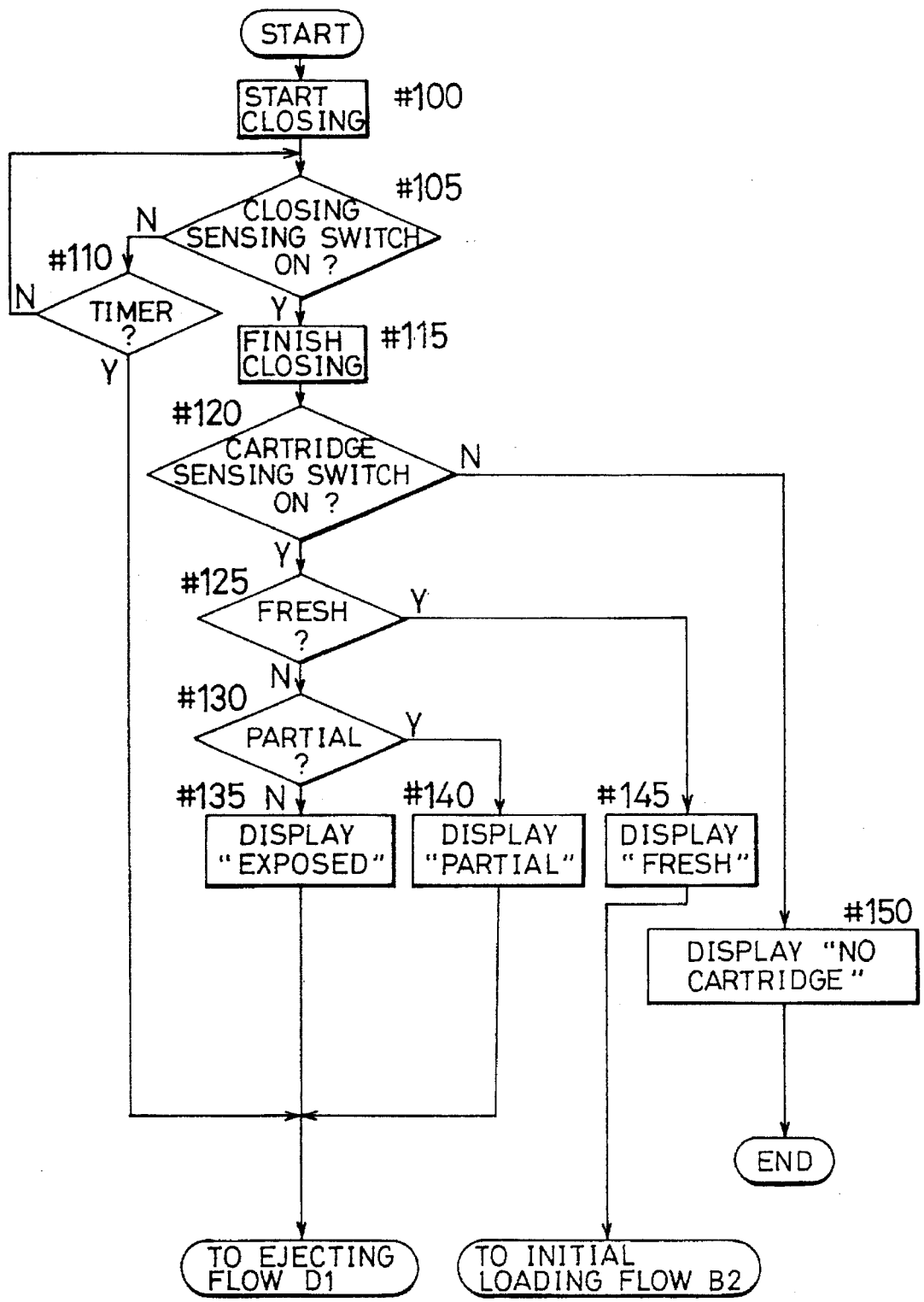
FIG. 21 is a flowchart of a closing operation of the third embodiment of the present invention.

Then, at step #630, whether or not the last frame of the film is sensed by the film transporting photoreflector 9 is determined. When the last frame is sensed, the process proceeds to step #635. When the last frame is not sensed, at step #640, whether or not the condition of the partially exposed film rewinding switch 15 is changed from OFF to ON is determined. When the switch 15 is OFF, the process returns to step #630 so that the process waits until the interrupt by the release switch 19 is applied after the taking operation, or until the partially exposed film rewinding switch 15 is turned ON. When the switch 15 is ON, the process proceeds to step #635. At step #635, the interrupt by the release switch 19 is inhibited, and the process proceeds to the rewinding flow C2 (FIG. 21).

Referring to the flowchart of FIG. 21, the closing operation will be described. When it is determined that the closing sensing switch 16 is OFF at step #645 of the interrupt flow INT.4 (FIG. 20), the closing operation of FIG. 21 is started according to the closing flow A4. In FIG. 21, steps at which the same operations as those of the steps of FIGS. 9 to 11 are given the same step numbers and no detailed description thereof will be given. This closing operation is the same as the previously-described third closing operation (FIG. 11) except that the process proceeds to the ejecting flow D1 (FIG. 24) when it is determined at step #110 that the closing sensing switch 16 is not turned on even after the predetermined period of time has elapsed and when the display is provided at step #135 or #140, and to an initial loading flow B2 when the display is provided at step #145. That is, the ejecting operation is performed when the film cartridge 1 is in the exposed condition or in the partial condition, and the initial loading operation is performed when the film cartridge 1 is in the fresh condition.

Figure 22:
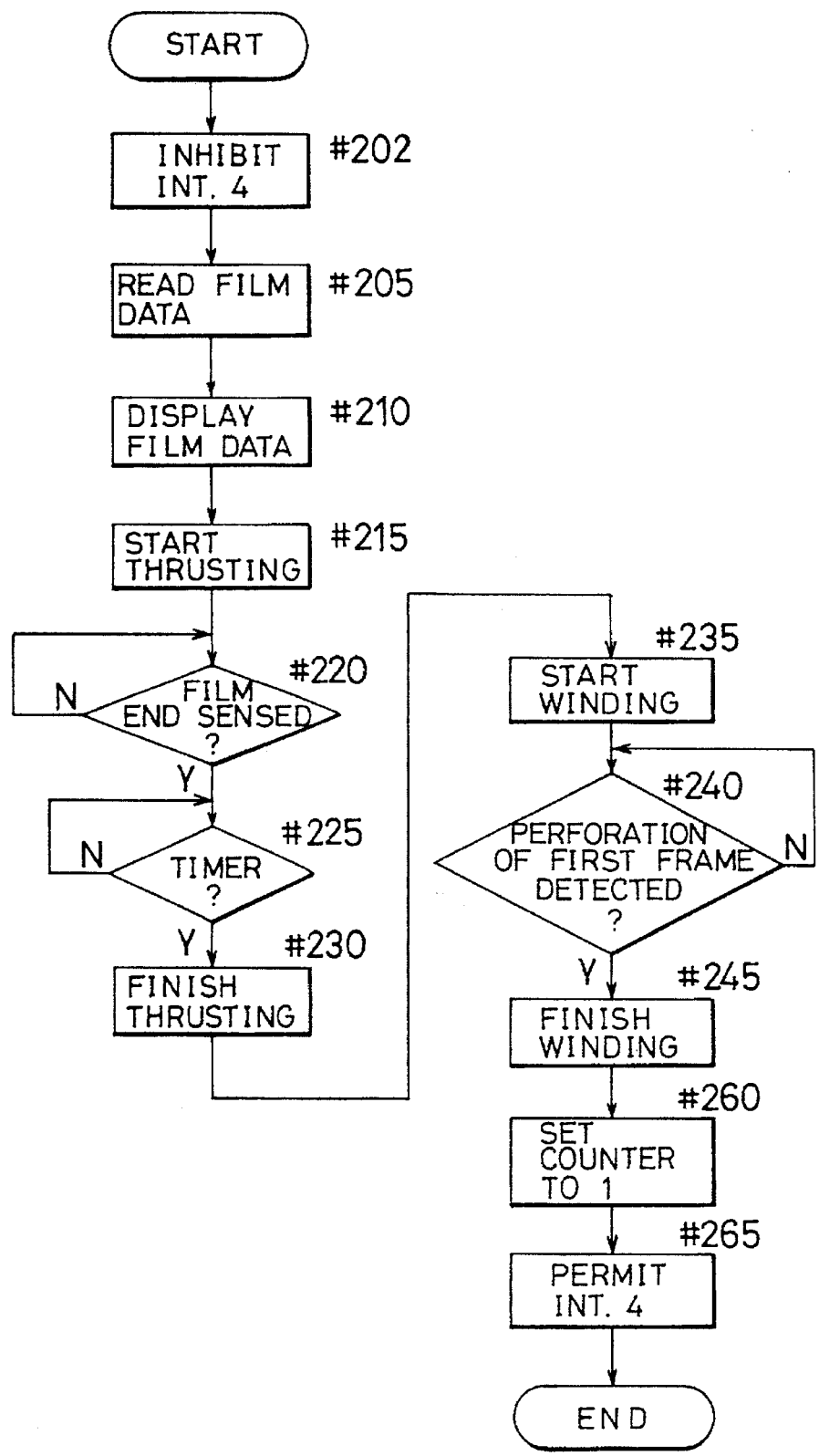
FIG. 22 is a flowchart of an initial loading operation of the third embodiment of the present invention.

Referring to the flowchart of FIG. 22, the initial loading operation will be described. After "FRESH" is displayed in the closing flow A4 (FIG. 21), the initial loading operation is started according to the initial loading flow B2. In FIG. 22 steps at which the same operations as those of the steps of FIG. 12 are given the same step numbers and no detailed description thereof will be given. This initial loading operation is the same as the initial loading flow B1 except that the operation of #200 (FIG. 12) is replaced by the operation of step #202 an that the operations of steps #250 and #255 (FIG. 12) are replaced by the operations of steps #260 and #265.

Specifically, at step #202, the interrupt according to the interrupt flow (taking flow) INT.4 (FIG. 20) is inhibited to thereby inhibit the closing operation by the interrupts of the closing, ejecting and release operations by the release switch 19. At step #260, the count number of the frame counter 38 is set to 1. At step #265, the interrupt according to the interrupt flow INT.4 (FIG. 20) is permitted to thereby permit the interrupt of the release operation by the release switch 19.

Figure 23:
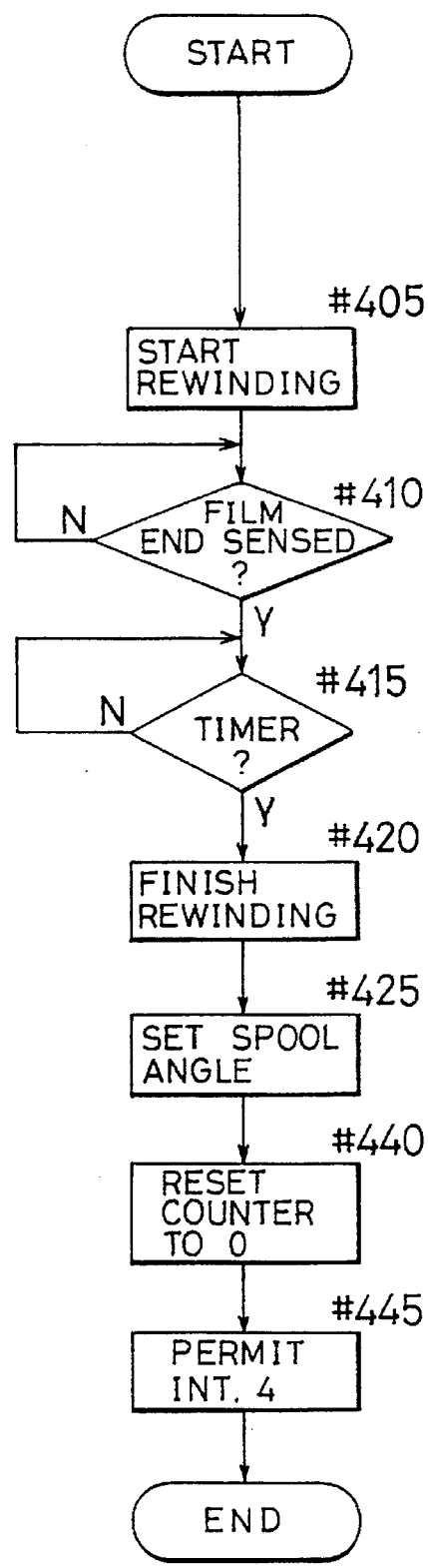
FIG. 23 is a flowchart of a rewinding operation of the third embodiment of the present invention.

Referring to the flowchart of FIG. 23, the rewinding operation will be described. When step #635 of the interrupt flow INT.4 (FIG. 20) is finished, the film rewinding operation is started according to the rewinding flow C2. In FIG. 23, steps at which the same operations as those of the steps of FIG. 14 are given the same step numbers and no detailed description thereof will be given. This rewinding operation is the same as the rewinding flow C1 (FIG. 14) except that the operations of steps #400 and #430 (FIG. 14) are not performed and the operations of step #440 and #445 are performed.

At step #440, the frame counter 38 is reset to 0. At step #445, the interrupt according to the interrupt flow INT.4 (FIG. 20) is permitted to thereby permit the interrupts of the closing and ejecting operations by the release switch 19.

Figure 24:
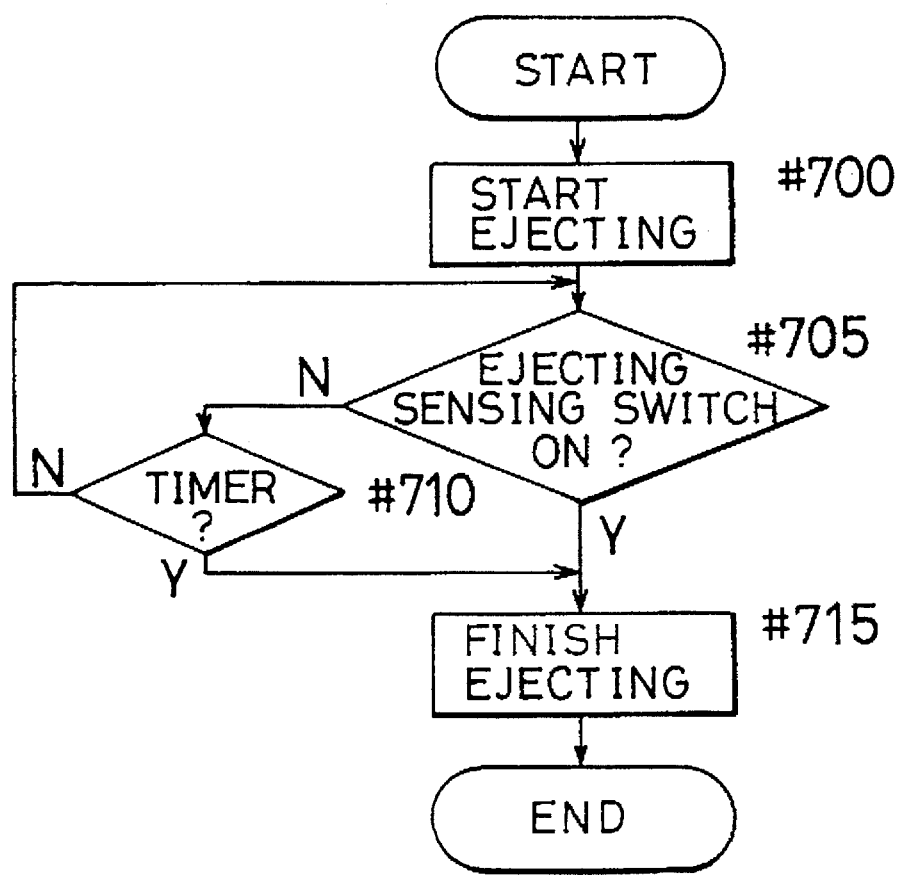
FIG. 24 is a flowchart of an ejecting operation of the third embodiment of the present invention.

Referring to the flowchart of FIG. 24, the ejecting operation will be described. In the closing flow A4 (FIG. 21), when it is determined at step #110 that the closing sensing switch 16 is not turned ON even after the predetermined period of time has elapsed and when the display is provided at step #135 or #140, the ejecting operation is started according to the ejecting flow D1.

First, at step #700, the ejecting motor 6 is rotated to start the ejecting operation. At step #705, whether the ejecting sensing switch 17 is ON or OFF is determined. When the ejecting sensing switch 17 is OFF, since the cartridge holder 23 is at the closed position shown in FIG. 6 or is being ejected, whether or not a predetermined period of time has elapsed since the ejecting is started (step #700) is determined based on a timer (step #710). When the predetermined period of time has not been elapsed, the process returns to step #705. When the ejecting sensing switch 17 is not turned ON even after the predetermined period of time has elapsed since the ejecting is started, the ejecting motor 6 is stopped to finish the ejecting operation (step #715).

Thus, when the ejecting is not sensed even after the predetermined period of time has been elapsed since the ejecting is started, it is determined that the cartridge holder 23 is overloaded in the middle of the ejecting operation, and the ejecting operation is forcibly finished, thereby preventing the breakage of members such as the ejecting motor 6, the cartridge holder 23 and the cartridge holder driving gear 29.

Moreover, the ejecting operation of the cartridge holder 23 may be started when the power is activated by operating a power switch under a condition where no film cartridge 1 is fitted in the cartridge chamber 24.

By providing an operation member such as the ejecting switch 20 of the first and second embodiments and the release switch 19 of the third embodiment having a plurality of functions such as ejecting and closing which are not simultaneously used, the camera is simple in structure, and the misoperation of the switch is prevented without providing any separate operation members for opening and closing the cartridge holder 23. Further, all of the operations associated with the opening and closing of the cartridge holder 23 may be performed automatically or by operating an operation member other than the ejecting switch 20, the release switch 19 and the power switch provided with a plurality of functions which are not performed simultaneously.

As described above, the microcomputer controls the ejecting motor to control the ejecting operation so that the cartridge holder is ejected in succession to the completion of the rewinding operation to make the film cartridge detachable, even a beginner will find out that all the frames have been exposed and the replacement of the film cartridge is necessary. Since the cartridge holder is ejected, the user will easily find out where the film cartridge is detached and attached. Thus, a camera is realized which urges the replacement of the film cartridge in a manner which even a beginner would understand easily. Moreover, the number of operations which the user has to perform is minimized so that a beginner may use the camera with ease.

Obviously, many modifications and variations of the present invention are possible in light of the above teachings. It is therefore to be understood that within the scope of the appended claims, the invention may be practiced other than as specifically described.

TABLE 1

| Mode | Condition of Film Cartridge | | |
|---|---|---|---|
| | Fresh Condition | Partial Condition | Exposed Condition |
| Mode 1 | Wait until switch 14 is on | Wait until switch 14 is on | To ejecting operation |
| Mode 2 | To thrusting operation | Wait until switch 14 is on | To ejecting operation |
| Mode 3 | To thrusting operation | To thrusting operation | To ejecting operation |

TABLE 2

| Mode | |
|---|---|
| Mode A | After cartridge spool angle is set, wait until switch 20 is ON |
| Mode B | After cartridge spool angle is set, proceed to ejecting operation |

What is claimed is:

1. An apparatus using a film cartridge, comprising:
   a space provided in a body of the apparatus for housing the film cartridge;
   an ejector which ejects the film cartridge from the film cartridge housing space to a position outside of the film cartridge housing space;
   a film rewinder which rewinds a film into the film cartridge; and
   a controller which activates the ejector in response to a completion of rewinding performed by the film rewinder.

2. An apparatus as claimed in claim 1, wherein said film cartridge is fitted in a cartridge holder, and wherein a position of the cartridge holder is shifted between an ejected position where the film cartridge is attachable and detachable and a closed position where the film cartridge is housed in the film cartridge housing space.

3. An apparatus as claimed in claim 1, wherein said film cartridge used by the apparatus is capable of displaying a condition of the film according to an angle at which a spool for rewinding the film of the film cartridge is stopped, and wherein said apparatus has a setter which sets the spool of the film cartridge at a predetermined angle when the rewinding is completed, and wherein said controller ejects the film cartridge after the setting of the spool at the predetermined angle is completed.

4. An apparatus as claimed in claim 1, wherein said apparatus is a camera.

5. An apparatus using a film cartridge, comprising:
   a space provided in a body of the apparatus for housing the film cartridge;
   a mechanism which ejects the film cartridge to a position outside of the film cartridge housing space and which sets the film cartridge in the film cartridge housing space;
   an operation member that is operated to activate the mechanism;
   a sensor which senses whether the film cartridge has been ejected or set by the mechanism;
   a film rewinder which rewinds a film into the film cartridge; and
   a controller which, in response to an operation of the operation member, controls the mechanism to eject the film cartridge in response to a completion of a rewinding of the film by the film rewinder when the sensor senses that the film cartridge has been set and controls the mechanism to set the fill cartridge when the sensor senses that the film cartridge has been ejected.

6. An apparatus as claimed in claim 5, wherein said apparatus is a camera.

7. An apparatus using a film cartridge, comprising:
   a space provided in a body of the apparatus for housing the film cartridge;
   a mover which ejects the film cartridge to a position outside of the film cartridge housing space and sets the film cartridge in the film cartridge housing space;
   a hindrance sensor which senses that the film cartridge is hindered from being set in the film cartridge housing space while the mover is operating; and
   a controller which, in response to a sensing by the hindrance sensor, stops setting of the film cartridge in the film cartridge housing space by the mover.

8. An apparatus as claimed in claim 7, wherein said controller ejects the film cartridge after stopping the setting of the film cartridge in the film cartridge housing space by the mover.

9. An apparatus as claimed in claim 7, wherein said apparatus is a camera.

10. An apparatus using a film cartridge, comprising:
    a space provided in a body of the apparatus for housing the film cartridge;
    a projector ejector which ejects the film cartridge to an outside of the film cartridge housing space;
    a film rewinder which rewinds a film into the film cartridge;
    an operation member operated to activate the ejector; and
    a controller which, when the operation member is operated while the film is being rewound by the film rewinder, activates the ejector after the rewinding is completed.

11. An apparatus as claimed in claim 10, wherein said film cartridge used by the apparatus is capable of displaying a condition of the film according to an angle at which a spool for rewinding the film of the film cartridge is stopped, and wherein said apparatus has a setter which sets the spool of the film cartridge at a predetermined angle when the rewinding is completed, and wherein said controller ejects the film cartridge after the setting of the spool at the predetermined angle is completed.

12. An apparatus as claimed in claim 10, wherein said apparatus is a camera.

13. An apparatus using a film cartridge, comprising:
    a space provided in a body of the apparatus for housing the film cartridge;
    a cartridge holder for holding the film cartridge, said film cartridge being fitted in the cartridge holder outside the film cartridge housing space and then being housed in the film cartridge housing space;
    a cartridge holder driver which drives the cartridge holder; and
    a controller which controls the cartridge holder driver to move the cartridge holder into the film cartridge housing space after a predetermined period of time has elapsed since the cartridge holder moves to a position outside of the film cartridge housing space.

14. An apparatus as claimed in claim 13, wherein said apparatus is a camera.

* * * * *